US008037471B2

(12) United States Patent
Keller et al.

(10) Patent No.: US 8,037,471 B2
(45) Date of Patent: Oct. 11, 2011

(54) SYSTEMS AND METHODS FOR CONSTRUCTING RELATIONSHIP SPECIFICATIONS FROM COMPONENT INTERACTIONS

(75) Inventors: Alexander Keller, New York, NY (US); Wim DePauw, Scarborough, NY (US)

(73) Assignee: International Business Machines Corporation, Armonk, NY (US)

( * ) Notice: Subject to any disclaimer, the term of this patent is extended or adjusted under 35 U.S.C. 154(b) by 1138 days.

(21) Appl. No.: 11/560,532

(22) Filed: Nov. 16, 2006

(65) Prior Publication Data

US 2008/0120400 A1  May 22, 2008

(51) Int. Cl.
 *G06F 9/445* (2006.01)
(52) U.S. Cl. ........................................ 717/174; 717/177
(58) Field of Classification Search .................. 717/177
 See application file for complete search history.

(56) References Cited

U.S. PATENT DOCUMENTS

| | | | |
|---|---|---|---|
| 4,751,635 A | 6/1988 | Kret | |
| 5,493,682 A | 2/1996 | Tyra et al. | |
| 5,721,824 A | 2/1998 | Taylor | |
| 5,805,891 A | 9/1998 | Bizuneh et al. | |
| 5,835,777 A | 11/1998 | Staelin | |
| 5,867,714 A | 2/1999 | Todd et al. | |
| 5,960,196 A | 9/1999 | Carrier, III et al. | |
| 5,999,740 A | 12/1999 | Rowley | |
| 6,009,525 A | 12/1999 | Horstmann | |
| 6,434,568 B1* | 8/2002 | Bowman-Amuah | 1/1 |
| 6,912,710 B2 | 6/2005 | Broussard et al. | |
| 6,957,422 B2* | 10/2005 | Hunt | 717/130 |
| 7,055,130 B2 | 5/2006 | Charisius et al. | |
| 7,415,712 B2* | 8/2008 | Hunt | 719/315 |
| 2002/0087734 A1 | 7/2002 | Marshall et al. | |
| 2002/0129346 A1 | 9/2002 | Lee et al. | |
| 2002/0147764 A1 | 10/2002 | Krupczak | |
| 2003/0051066 A1 | 3/2003 | Pace et al. | |
| 2003/0110253 A1 | 6/2003 | Anuszczyk et al. | |
| 2004/0031015 A1 | 2/2004 | Ben-Romdhane et al. | |
| 2004/0158571 A1 | 8/2004 | Kovacs et al. | |
| 2004/0158585 A1 | 8/2004 | Kovacs et al. | |
| 2004/0230942 A1 | 11/2004 | Garms et al. | |
| 2005/0010926 A1 | 1/2005 | Narayanaswamy et al. | |
| 2005/0192979 A1 | 9/2005 | Keller et al. | |
| 2007/0083425 A1* | 4/2007 | Cousineau et al. | 705/14 |
| 2007/0240224 A1* | 10/2007 | Agrawal et al. | 726/25 |

OTHER PUBLICATIONS

Tran, "Automatic Generation of Protocol Converters from Scenario-based Specification", 2005, National University of Singapore.*
Filho et al. "Interaction Pattern Gathering in Service-oriented Applications", 2005, IEEE.*
Orlic et al. "Interacting Components", 2006, pp. 179-202.*

* cited by examiner

*Primary Examiner* — Wei Zhen
*Assistant Examiner* — Phillip H Nguyen
(74) *Attorney, Agent, or Firm* — Louis J. Percello; Ryan, Mason & Lewis, LLP

(57) ABSTRACT

Techniques for automatically creating at least one relationship specification are provided. For example, one computer-implemented technique includes observing at least one interaction between two or more components of at least one distributed computing system, consolidating the at least one interaction into at least one interaction pattern, and using the at least one interaction pattern to create at least one relationship specification, wherein the at least one relationship specification is useable for managing the at least one distributed computing system.

35 Claims, 13 Drawing Sheets

SYSTEMS AND METHODS FOR CONSTRUCTING RELATIONSHIP SPECIFICATIONS FROM COMPONENT INTERACTIONS

FIELD OF THE INVENTION

The present invention relates to distributed computing systems and, more particularly, to systems and methods for constructing relationship specifications from component interactions.

BACKGROUND OF THE INVENTION

Implementing changes for hardware, software, network and storage systems in large-scale electronic-business (e-Business) environments remains burdensome to customers. Rolling out changes, such as installing and uninstalling, upgrading or configuring systems can take weeks, partly because the complex interdependencies between applications and their supporting services are not made explicit. Therefore, human involvement and expertise is required.

Solving this change management problem automatically is advantageous in addressing the increasing complexity of computing systems. The number of relationships of a single computing resource (for example, a software component, a network component, a storage system) range from 10 to 100. The number of computing resource instance relationships in large-scale enterprise systems is often between 1,000,000 and 1,000,000,000. Given that a change to one or more computing resources may entail additional changes on a multitude of other computing resources, it is evident that minimizing the need for human involvement in the change management process would be advantageous.

Change management is a process that offers many automation challenges. The organizational frameworks behind existing change management processes tend to be ill-defined and highly variable in detail and formality. This makes it difficult to identify tasks for automation or to reuse standardized automation across environments within or between information technology (IT) organizations (for example, this is a particular problem for corporate mergers). Additionally, effective change management requires a great deal of accurate information on technical constraints, such as dependencies between IT services, the components that implement them, and the infrastructure supporting them. This information is rarely documented formally or kept up to date, therefore hindering change assessment and change impact prediction.

Existing approaches involving service providers and enterprise IT departments require setting up staging areas where changes are repeatedly tested to expose their potential impacts (and adjusted accordingly) before they can be safely deployed into production environments. Building staging environments is done manually in a step-by-step fashion and is documented in textual documents, termed 'build sheets' or 'run books' that are written in a natural language. Build sheets and run books are used to construct the production system, which is typically significantly larger than the staging system. This textual, human-readable representation, however, restricts the usage and execution of build sheets and run books to humans only. In particular, neither build sheets nor run books can be executed by an automated software deployment and provisioning system.

In addition, existing approaches, such as Integrated Development Environments (IDE), do not capture dependency information. Instead, existing approaches capture the containment hierarchy of a single individual software system that is being implemented without taking into account the existence of other software systems with which the software system under development needs to interact.

Existing approaches in the area of dependency management fall into 3 categories. The first category of approaches requires user input, that is, the manual entry of dependencies. An existing approach in this category is U.S. patent application Ser. No. 09/835,528 entitled "Method and Apparatus for identifying Software Components using Object Relationships and Object usages in Use Cases," filed Apr. 17, 2001. This approach includes obtaining object dependency and object usages information from a user. Another existing approach in this first category is U.S. patent application Ser. No. 09/750,305 entitled "System and Method for managing Dependencies in a component-based System," filed Dec. 29, 2000. This approach includes defining a resource that is part of an entity, recording a resource specifier for the resource, and recording resource dependency relationships definitions for the resource.

The second category of dependency management approaches requires access to the source code of all the components of an application in order to derive dependencies. An existing approach in this category is U.S. patent application Ser. No. 09/865,300 entitled "System and Method for the Manipulation of Software," filed May 24, 2001. This approach includes analyzing a body of source code and deriving a set of components from the software architecture inherent in the body of source code. Another existing approach in this second category is U.S. patent application Ser. No. 09/839,644 entitled "Methods and Systems for identifying Dependencies between object-oriented Elements," filed Apr. 20, 2001. This approach includes allowing a developer to simultaneously view a graphical and a textual display of source code.

The third category of dependency management approaches requires the presence of appropriate management instrumentation that surfaces dependency information. An existing approach in this category is U.S. patent application Ser. No. 10/055,426 entitled "Method and Apparatus for Distributed Systems Management," filed Jan. 23, 2002. This approach includes providing a first agent monitoring a first managed device. Another existing approach in this third category is U.S. patent application Ser. No. 10/021,535 entitled "Methods and Apparatus for managing Components in an IT System," filed Dec. 21, 2001. This approach includes discovery of components carried out using fingerprints of components, which can include key elements of the component that exist in a full model of all of the elements of the component.

Existing approaches in the area of software development include U.S. Pat. No. 4,751,635, which includes a host computer extracting information from each of the support system databases to obtain data indicative of development activity for various phases of the life cycle of the software system. Another existing approach in this area is U.S. Pat. No. 5,960,196, which includes a metric collector that provides a list of available metrics related to software development, tests, and loads building for the user's selection.

Existing approaches in the area of maintenance include U.S. Pat. No. 5,493,682, which includes assembling executable systems from defined component parts such as source code files and object code files.

Existing approaches in the area of software packaging include U.S. Pat. No. 5,835,777, which includes combining listed files, the needed resources, and any related installation materials.

Existing approaches in the area of electronic software distribution of whole program packages include U.S. Pat. No.

6,009,525, which includes software products being wrapped by their publishers in a straightforward, secure manner, but in such a way as to allow for the addition of information by downstream distribution channel partners, for example, distributors and merchants (resellers). Another existing approach in this area is U.S. Pat. No. 5,721,824, which includes installation of each dominant, or primary, package and installation of the dependent, or secondary, packages dependent on that dominant package.

Existing approaches in the area of updates and/or corrections and/or fixes and/or patches include U.S. Pat. No. 5,999,740, which includes accessing a remote file server to obtain a release file containing a list of software applications available from the remote server, and comparing the release file with the registration file to determine which of the installed applications have upgrades available. Another existing approach in this area is U.S. Pat. No. 5,805,891, which includes determining whether the software maintenance module requires test, and submitting the module to test if required.

Existing approaches in the area of determining conflicts in existing software and/or hardware configurations include U.S. Pat. No. 5,867,714, which includes communications circuitry that, from time to time, automatically transmits at least part of the current hardware and software configuration data of the computer system to a remote data source capable of identifying inherent conflicts in the hardware and software configuration.

The existing change management approaches rely on detailed static or design information, source code or management instrumentation.

It would thus be desirable to overcome these and other limitations in existing change management approaches.

SUMMARY OF THE INVENTION

Principles of the present invention provide techniques for constructing relationship specifications from component interactions.

For example, in one aspect of the invention, a computer-implemented technique for automatically creating at least one relationship specification includes the following steps. At least one interaction between two or more components of at least one distributed computing system is observed. The at least one interaction is consolidated into at least one interaction pattern. The at least one interaction pattern is used to create at least one relationship specification, wherein the at least one relationship specification is useable for managing the at least one distributed computing system.

In another aspect of the invention, a computer-implemented technique includes the following steps. At least one task relationship and at least one corresponding relationship constraint of at least one computing system are determined. The at least one task relationships is consolidated with the at least one corresponding relationship constraint. The at least one consolidated task relationship and relationship constraint are used to generate at least one deployment descriptor. The at least one deployment descriptor is stored, wherein the at least one deployment descriptor is useable for subsequent reuse and processing in managing the at least one distributed computing system In contrast to the above-mentioned limitations in existing approaches, principles of the invention overcome such shortcomings by, for example, being able to generating deployment descriptors even if no reliable dependency information is present.

One or more embodiments of the invention may provide one or more beneficial technical effects, such as, for example, eliminating the requirement that the distributed system provide management instrumentation. Furthermore, one or more embodiments of the invention may provide one or more beneficial technical effects, such as, for example, eliminating the need for available source code.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

One or more embodiments of the present invention relates to distributed computing systems and, more particularly, to systems and methods for automatically constructing deployment descriptors. Deployment descriptors are machine-readable relationship specifications.

One or more embodiments of the present invention generate dependency relationship information itself by observing one or more interactions among the components of a distributed computing system. In a preferred embodiment of the invention, observing one or more interactions occurs at run-time. One or more embodiments of the present invention are able to generate deployment descriptors even if no reliable dependency information is initially present. Consequently, a distributed system neither has to provide management instrumentation, nor is there a need for the availability of source code.

One or more embodiments of the present invention include executing the techniques described herein with already-packaged software products.

Figure 1:
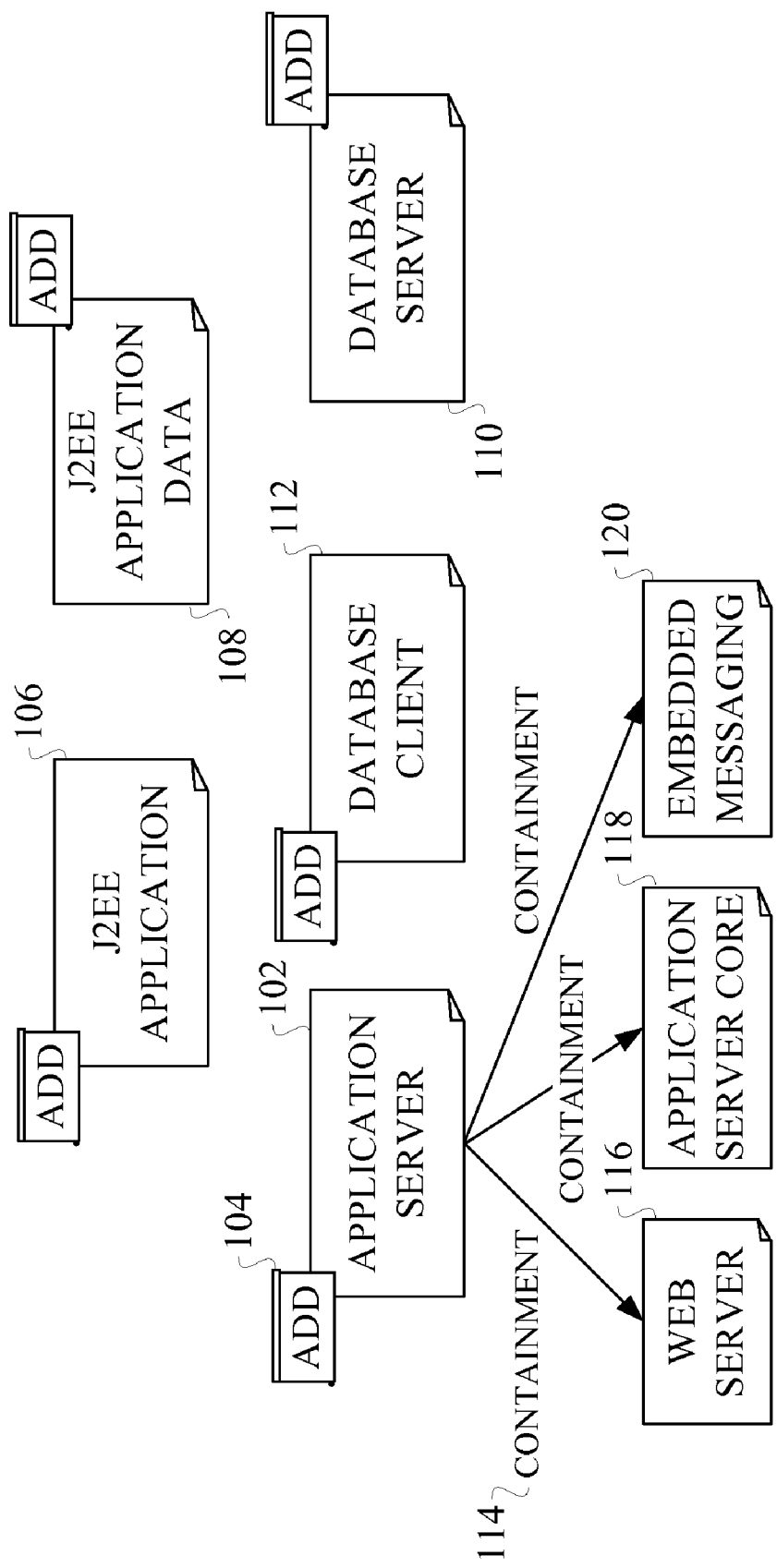
FIG. 1 is a diagram illustrating an existing approach for isolated applications and associated application deployment descriptors (ADD), according to an embodiment of the present invention.

FIG. 1 depicts an existing approach including individual, isolated application and associated application deployment descriptors (ADD). For each application that runs on a single computing system, such as an application server 102, a build system creates an associated application deployment descriptor (ADD) 104 that may contain, for example, identification and version information. The application may be broken down into its atomic elements, such as a web server 116, the application server core 118, and the component responsible for embedded messaging 120. This is reflected by a single type of relationship, namely containment (114), which is recorded in the ADD. Other examples of individual application components include applications, their data, and middleware systems, such as database servers and database clients. For purposes of completeness, an existing approach, such as depicted in FIG. 1, may include a Java 2 Platform, Enterprise Edition (J2EE) application 106, J2EE application data 108, a database client 112 and a database server 110, as well as ADDs associated therewith.

One or more embodiments of the present invention, in contrast, includes distributed, composed applications that are aggregated from multiple, already-packaged individual software systems for which no source code is available. One or more embodiments of the present invention construct deployment descriptors for such composed applications, termed composed application deployment descriptors (CADD), by observing the interactions among the components of computing systems. CADDs, in an exemplary embodiment, are machine-readable relationship specifications and serve as input to an automated software deployment and provisioning system in order to coordinate and orchestrate the aggregated installation, configuration and maintenance for an end-to-end composed application that spans a variety of products, technologies and application code (for example, in support information technology (IT) service management).

In one or more embodiments of the present invention, constructing CADDs includes reverse-engineering the blueprint of a composed application at run-time. Additionally, the dependencies between the shrink-wrapped individual applications that were aggregated are identified. One or more embodiments of the invention allow an administrator to identify the dependencies either for the distributed computing system as a whole, or for selected parts thereof. One or more embodiments of the invention also annotate CADDs with precedence and location constraints, and express the identified dependencies in a machine-readable format as CADDs. Additionally, one or more embodiments of the present invention store the identified CADDs persistently for subsequent reuse, and also allow the retrieval of CADDs to automatically build composed application by loading them and executing them by an automated deployment or provisioning system.

Economies of scale may be accomplished because the knowledge gleaned from a smaller-scale system can be reused for the construction of a production system that is typically at least a magnitude larger than the staging system. In addition, persistently storing the constructed deployment descriptors in a deployment descriptor library allows for their reuse whenever similar computing systems need to be built in the future.

The identification and tracking of relationships between the components of distributed computing systems is advantageous for automated change management. For example, software components rely on a variety of supporting components. Consequently, applying a change to one component affects other components, that is, components have dependencies on other components. Dependencies exist between components on a single system and also between the components on multiple systems and organizational domains.

As used herein, "dependents" refer to components that depend on others, and "antecedents" refer to components on which other components depend.

A component often plays the role of both dependent and antecedent (for example, a component providing a name service is required by many applications and services but is depending itself on the proper functioning of other components, such as the operating system and the network protocols and infrastructure), thus leading to a dependency hierarchy that can be modeled as a directed graph.

Furthermore, dependency relationships are transitive, that is, the dependent of a given component requires, in addition to the component itself, the component's antecedent or antecedents as well. Dependencies exist between various components of a distributed system, such as, for example, end-user services, system services, applications, networking infrastructure components, and their logical and physical components.

In contrast to the existing approaches, one or more embodiments of the present invention generate deployment descriptors from observing and capturing the interactions or transactions occurring in a running system and subsequently condensing them into interaction patterns. Furthermore, one or more embodiments of the present invention transform one or more captured component interactions into deployment descriptors whose elements, representing the building blocks of a composed application, may be linked by temporal ordering (also referred to as precedence) and location constraints. Examples of such constraints are "The change management operation for component X must finish before the change management operation for component Y can begin," "the change management operation for component X cannot start until the change management operation for component Y does," "the change management operation for component X cannot finish before the change management operation for component Y does," and "the change management operation for component X cannot finish until the change management operation for component Y starts." Constraints apply to various types of change tasks, such as, for example, install, uninstall, configure, start, and stop.

One or more embodiments of the invention include a system that automatically captures one or more component interactions and their subsequent automated processing into CADDs. CADDs provide dependency information that facilitates an automated provisioning system in determining the order in which changes need to be carried out to transition one or more computing systems from a workable state into another workable state. The output of one or more embodiments of the invention can be consumed and modified by, for example, automated provisioning systems for data centers, or by enterprise software distribution and configuration tools. Furthermore, one or more embodiments of the present invention are able to store computed CADDs for subsequent reuse by storing them in a deployment descriptor library.

One having skill in the relevant art will recognize that modifications in the way dependencies are obtained, as well as the representation of dependencies, may be made without departing from the spirit and scope of the present invention. By way of example and not limitation, additional sources of dependency information, such as, for example, relationship registries, may be available. As used herein, a CADD refers to a machine-readable relationship specification. Information stored within a CADD is specific to a given combination of components, and may be decoupled from the computing systems and their characteristics (for example, computer processing unit (CPU) speed, random access memory (RAM), free and/or available disk space).

One purpose of the deployment descriptor generator disclosed herein is to construct reusable deployment descriptors for various change management operations from component interactions. A deployment descriptor may contain, for example, information about the change management operation that needs to be carried out (for example, install, update, configure, and/or uninstall). Also, a deployment descriptor may contain, for example, information about the roles and names of the components of a composed application, as well as the location constraints that may exist between the building blocks of a composed application, such as, for example, co-location (that is, a component must be present on the same system as another component) or ex-location (that is, a component must not be present on the same system as another component). Additionally, a deployment descriptor may contain, for example, information about the precedence constraints that may exist between the building blocks of a composed application, such as, for example, 'X must be installed before Y.'

In one or more embodiments of the present invention a deployment descriptor may contain, in addition to the aforementioned exemplary data, information that relates to the specific hardware characteristics of a computing system (such as CPU speed, RAM or total and/or available disk space) or names and internet protocol (IP) addresses of computing systems. However, one having skill in the relevant art will recognize that modifications in the types of data contained within deployment descriptors, as well as their representation, may be made without departing from the spirit and scope of the present invention.

One or more embodiments of the present invention add architectural elements to a change management system that enable such a system to initiate a change, trigger the acquisition of dependency relationship information along with location constraints, identify interaction patterns, and their subsequent automated processing the patterns into deployment descriptors. It should be noted that the applicability of one or more embodiments of the invention is not confined to the problem area of software provisioning and maintenance. One or more embodiments of the invention also can be used for other changes as they occur either during the configuration or reconfiguration of computing and software systems.

Given the above realizations made in accordance with one or more embodiments of the present invention, and general features associated therewith, the remainder of the detailed description will provide an illustrative explanation of techniques for implementing such realizations and features in the context of FIGS. 2 through 13.

Figure 2:
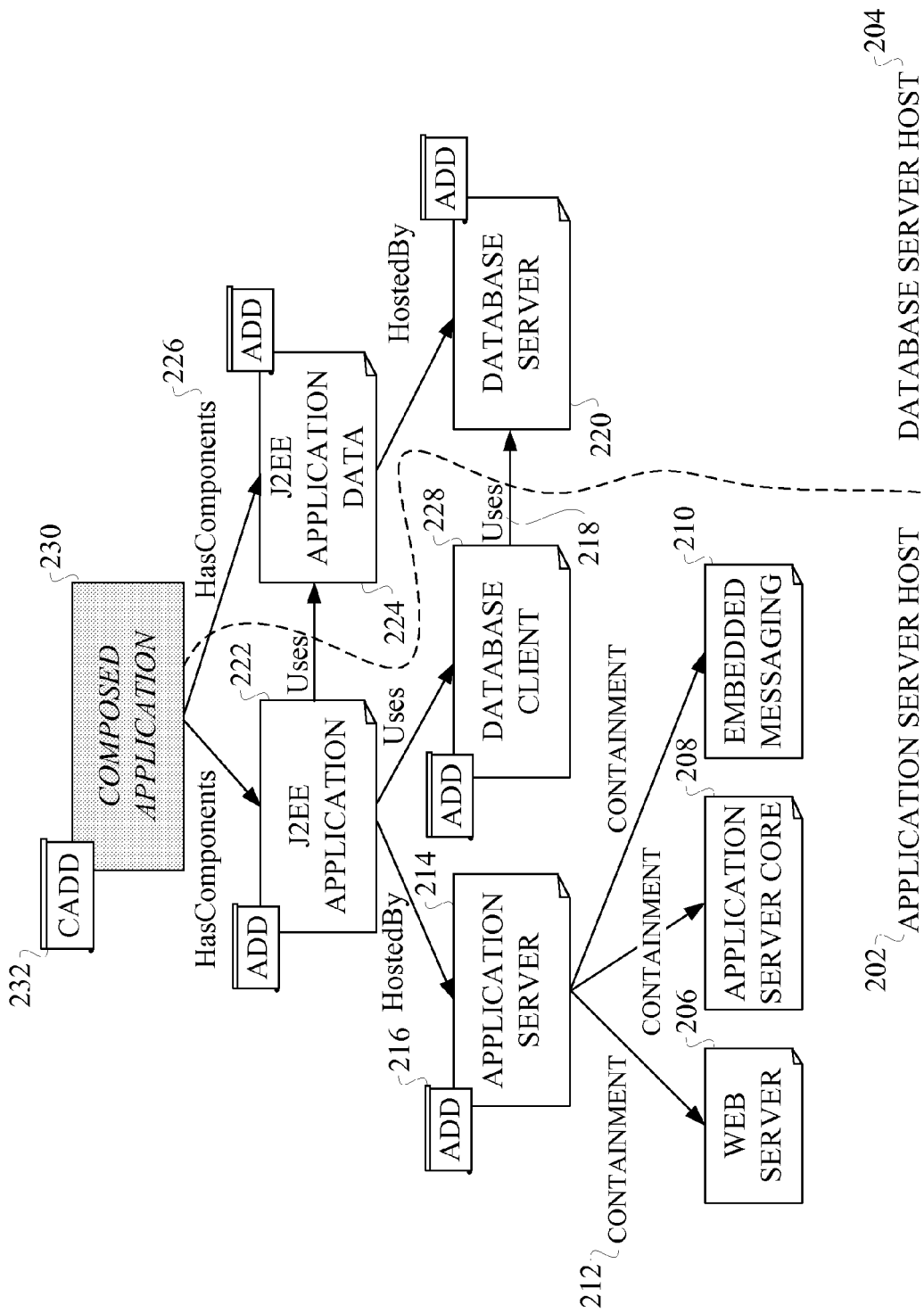
FIG. 2 is a diagram illustrating a composed application and a composed application deployment descriptor (CADD), according to an embodiment of the present invention.

FIG. 2 is a diagram illustrating a composed application and a composed application deployment descriptor (CADD), according to an embodiment of the present invention. In one or more embodiments of the invention, the composed application is aggregated from multiple, already packaged individual software systems and which spans two computing systems. The latter are denoted as application server host 202 and database server host 204, respectively. A composed application 230 is described by way of a CADD 232. As an example, the CADD 232 describing the overall composed application 230 references five ADDs for the following artifacts: the J2EE application 222, the J2EE application data 224, the application server 214, the database server 220, and the database client 228.

Each ADD 216 contains elements that represent the logical units of deployment that aggregate elements corresponding to the physical deployment units. More specifically, each individually packaged software product is represented by a separate ADD, whereas the logical and physical components that belong to the same product are further described within the product's ADD. In the example of application server 214, the highest-level elements are the web server 206, the application server core 208, for example, web and Enterprise JavaBeans (EJB) containers, and the embedded messaging component 210, which are further broken down into the various fine-grained software components. As all of them make up the application server product, their descriptions are contained in the application server's ADD (see also FIG. 1).

The set of deployment descriptors (one CADD, five ADDs) for the composed application and the underlying middleware stack reflect the structure depicted in FIG. 2. One can see that a set of deployment descriptors represents a directed graph. While dependencies between the elements within an ADD describe a software containment hierarchy 212, CADDs provide additional dependency types. For example, whenever a component referenced within a CADD depends on another element belonging to a different product (and therefore is specified in an ADD), the latter is referenced in the CADD. For example, the CADD 232 of the overall composed application 230 defines by way of the 'HasComponents' relationship 226 that the J2EE application data component 224 is a part of the overall composed application.

The 'uses' relationship 218 specifies that the database server 220 is accessed by the database client 228. Such dependencies, which apply to a multi-system scenario (and therefore do not exist in the existing single-system installers approaches), provide a way of augmenting dependencies with meta-information that facilitates a change management system to take the proper decisions. Each dependency type needs to be handled differently by a change management system. CADDs provide the necessary metadata.

Figure 3:
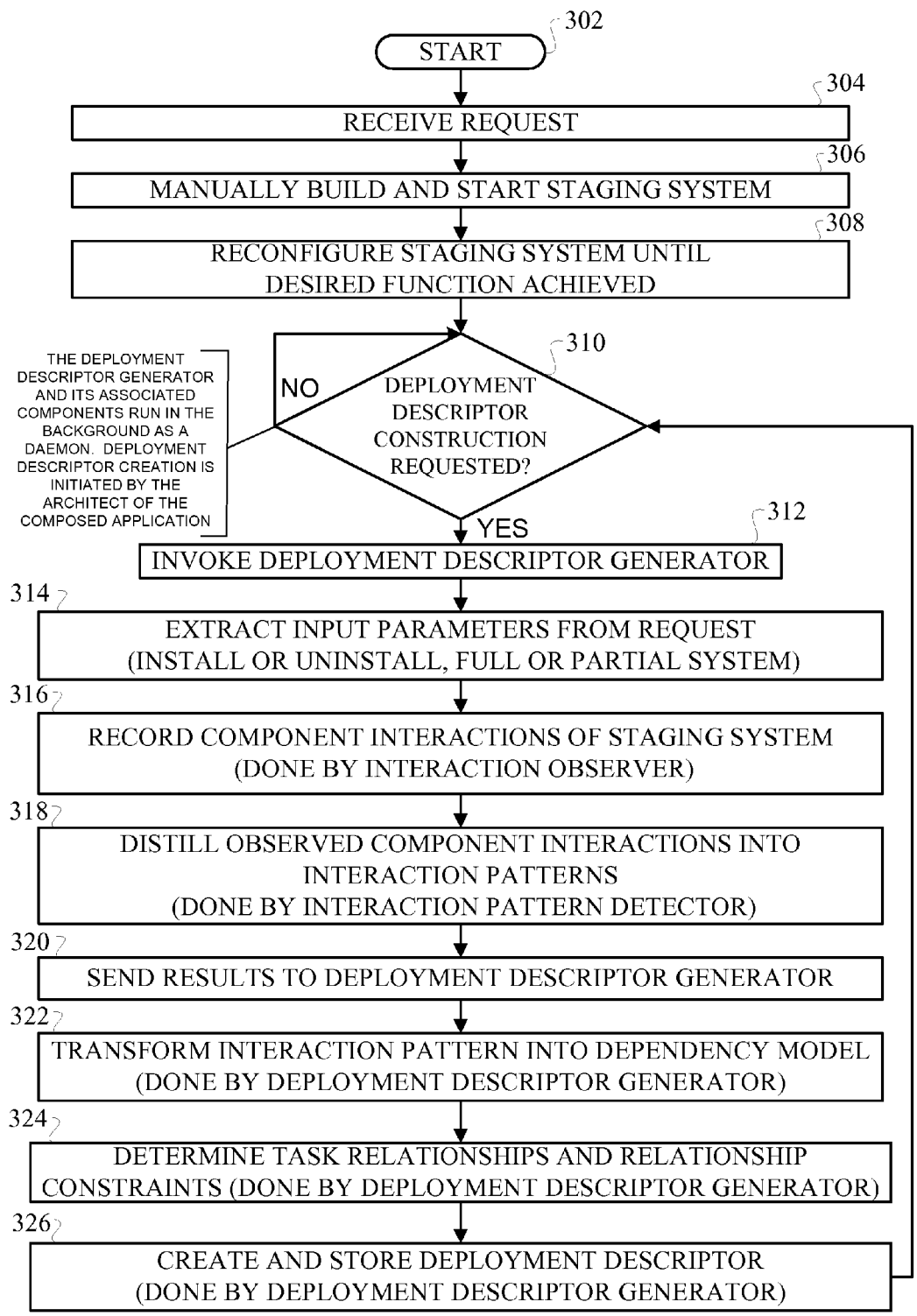
FIG. 3 is a flow diagram illustrating the control flow for constructing deployment descriptors, according to an embodiment of the present invention.

FIG. 3 is a flow diagram illustrating the control flow for constructing deployment descriptors, according to an embodiment of the present invention. By way of illustration, FIG. 3 depicts a scenario in which a deployment descriptor is being generated from a running system in a staging environment in order to deploy and configure a production system. One skilled in the relevant art will recognize that modifications and extensions of the staging and/or production system scenario may be made without departing from the spirit and scope of the invention. More specifically, one or more embodiments of the invention apply to any scenario where the architectural blueprint of a running distributed system needs to be constructed without prior knowledge of the system itself, and where the algorithms, steps and procedures that were applied during its construction need to be determined.

FIG. 3 includes various steps beginning with step 302. Upon receipt of a new request in step 304, a staging system is manually built and subsequently started in step 306. In one or more embodiments of the present invention, reconfigurations are applied to the staging system to make the system achieve its desired function in step 308, such as, for example, setting tuning parameters to accomplish a specified system performance. In one or more embodiments of the invention, after the reconfiguring step is complete, the staging system is fully functional and running.

Figure 4:
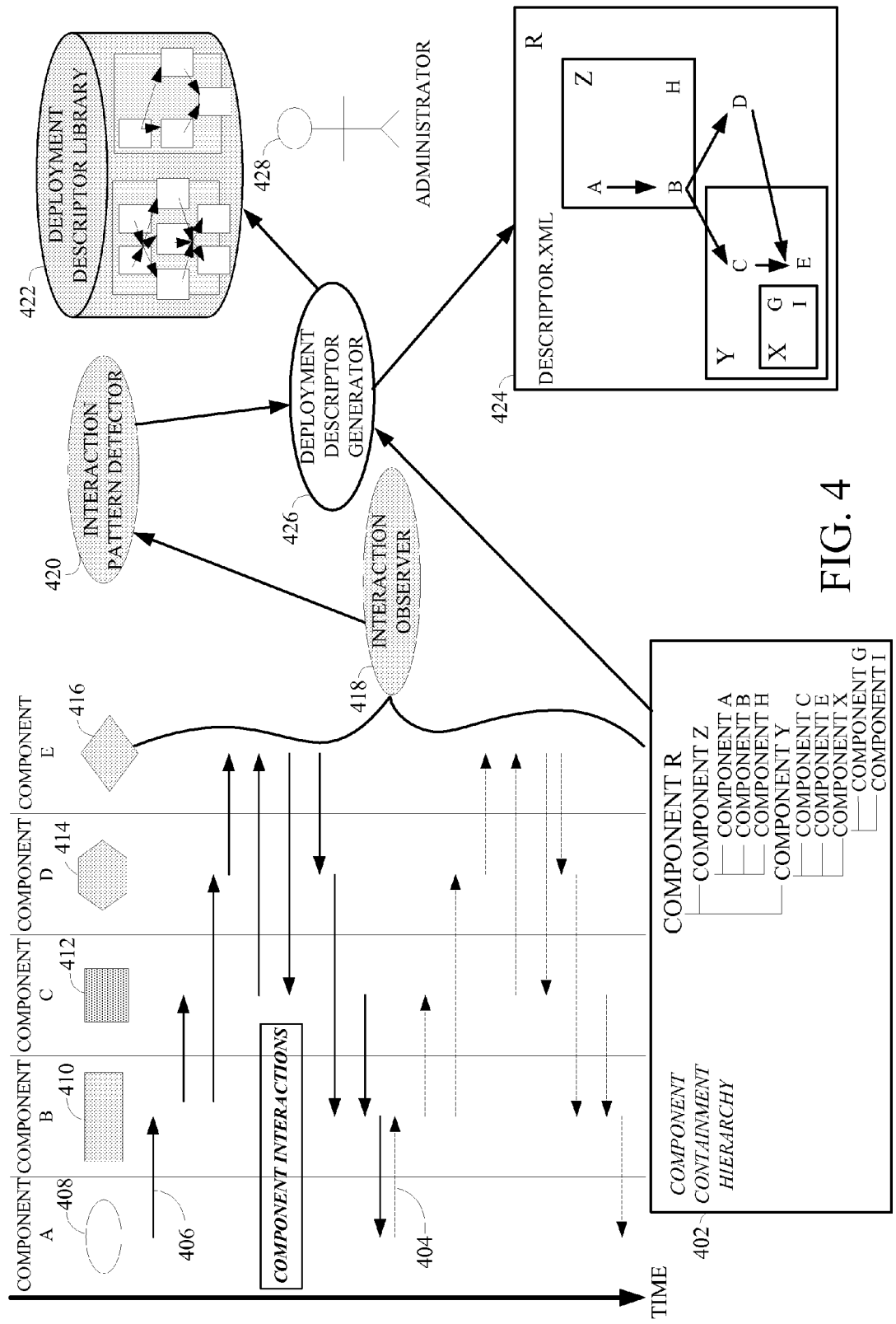
FIG. 4 is a diagram illustrating the flows between various components involved in a system for generating deployment descriptors from one or more component interactions, according to an embodiment of the present invention.

In a preferred embodiment, the system for generating deployment descriptors, including at least an interaction observer (418, as illustrated in FIG. 4), an interaction pattern detector (420, as illustrated in FIG. 4) and a deployment descriptor generator (426, as illustrated in FIG. 4), is implemented as a background server process (also referred to as a daemon) that is listening for incoming requests. If a request for constructing a deployment descriptor is received in step 310 from, for example, an administrator, the deployment descriptor generator 426 is invoked in step 312.

Input parameters are extracted from the request in step 314. Examples of such parameters may include, but are not limited to, whether a deployment descriptor for the entire distributed computing system is requested, or whether the request applies only to parts of the overall system. Additional examples of input parameters may include the name of the component or components to which the change applies, the system names, and the change management operation.

The component interactions of the staging system are recorded in step 316 by way of invoking the interaction observer 418, which monitors, observes and captures all transactions that the staging system is executing. The recorded component interactions are submitted to the interaction pattern detector 420, which extracts one or more patterns from the data stream in step 318, thereby significantly reducing the volume of data and identifying the characteristic data flow structure throughout the observed system. The identified interaction patterns are sent in step 320 to the deployment descriptor generator 426, a purpose of which may be, for example, to transform the interaction pattern or patterns into a dependency model in step 322, and determine task relationships and relationship constraints (for example, finish-to-finish (FF), finish-to-start (FS), start-to-finish (SF), and start-to-start (SS)) in step 324. Also, the deployment descriptor generator 426 may perform task consolidation to construct the deployment descriptor in step 326 in a machine-readable format, such as an extensible markup language (XML)-based language.

Additionally, the deployment descriptor may be stored in step 326 in a deployment descriptor library (422, as illustrated in FIG. 4) for subsequent reuse. Once the deployment descriptor for a given request has been generated and stored, the system may, in one or more embodiments of the invention, proceed back to step 310 to await further requests. A preferred embodiment of the invention allows the construction of deployment descriptor for both install-type scenarios (for example, change management operations such as install, deploy, start, and update) and uninstall-type scenarios (for example, change management operations such as uninstall, undeploy, stop, and undo) from the same set of interaction patterns. Also, in a preferred embodiment of the invention, the techniques may be invoked concurrently in order to service multiple requests at once.

FIG. 4 is a diagram illustrating the flows between various components involved in a system for generating deployment descriptors from component interactions, according to an embodiment of the present invention. A preferred embodiment of the present invention constructs deployment descriptors from component interactions at run-time and may include additional architectural elements described below.

An exemplary element may include an interaction observer 418. An interaction observer is contained in the same hosting environments (for example, operating system, Servlet/Enterprise JavaBeans (EJB) container) as the distributed components, and it tracks the invocation of operations on other components over time. In FIG. 4, two invocations 404 and 406 (at different points in time, visualized by the solid 406 and dashed arrows 404) of component A 408 lead to an invocation of component B 410, which results in further interactions with component C 412, component D 414, which leads to an interaction with component E 416.

Another exemplary element may include an interaction pattern detector 420. An interaction pattern detector 420 inputs the tracking data generated by the interaction observer 418. In FIG. 4, the two invocations of component A, 406 and 404 (solid and dashed arrows, respectively) lead to further invocations with components B 410, C 412, D 414, and E 416. However, since the invocation pattern is identical, the interaction pattern detector 420 consolidates these interactions into a single interaction pattern.

Yet another exemplary element may include a deployment descriptor generator 426. A deployment descriptor generator 426 inputs the data of the interaction pattern detector 420 and constructs a deployment descriptor 424, which, may, for example, have the structure of a directed graph. Also, the deployment descriptor generator 426 takes into account both the component containment hierarchy 402 as well as the different change management operations by annotating the relationship constraints in a deployment descriptor either for every single change management operation and/or change management pattern. Consequently, newly constructed nodes in the dependency graph include the name of the component and are tagged with the type of change management operation.

For purposes of completeness, one or more embodiments of the present invention may also include an administrator 428.

Also, another exemplary element may include a deployment descriptor library 422. A deployment descriptor library is a repository for storing newly constructed deployment descriptors 424 for subsequent reuse and processing.

Figure 5:
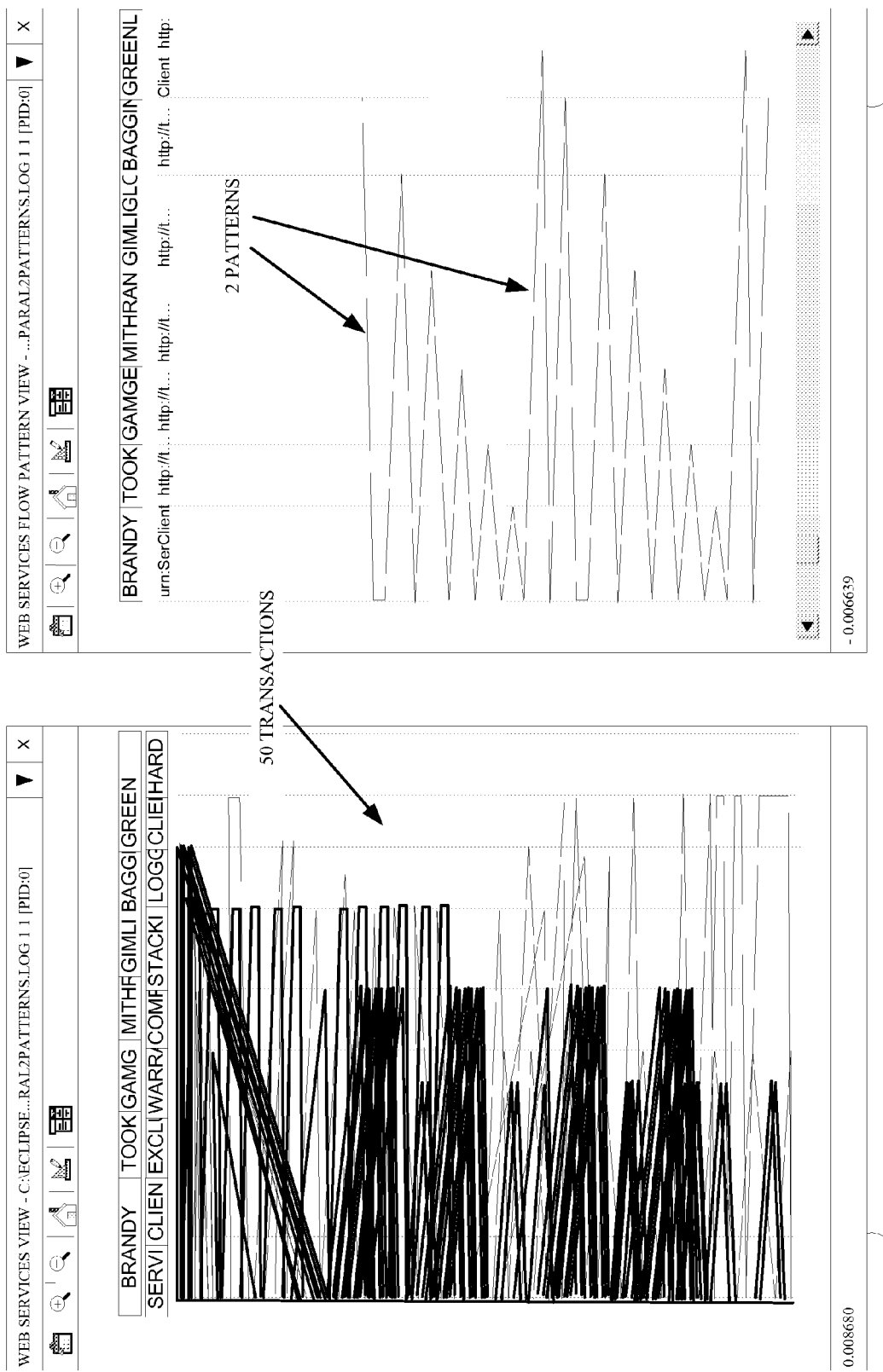
FIG. 5 is a diagram illustrating inputs and outputs of the interaction pattern detector, according to an embodiment of the present invention.

FIG. 5 is a diagram illustrating inputs and outputs of the interaction pattern detector 420, according to an embodiment of the present invention. An interaction observer 418 captures all the interactions between the components of the staging system. However, the amount of information that is typically recorded for realistic systems is prohibitively large for consumption by a user. This information is complex not only because of its sheer size, but also because of the large number of participating components and the concurrent character of the interactions. The left side 590 of FIG. 5 illustrates the recorded interactions of a typical system. This information is likely overwhelming to a user. To address this problem, one or more embodiments of the present invention use an interaction pattern detector 420 that extracts patterns from these many interactions.

In a preferred embodiment, a pattern extraction algorithm identifies interactions that have a causal relationship. There are many methods in the existing approaches to detect a causal relationship. In a preferred embodiment, we consider two interactions related by causality if the first interaction causes an event on a system in the same thread as a second interaction on the same system. There are other methods to establish causality, such as, for example, the propagation of an explicit correlation identifier.

As used herein, "transaction" refers to a set of all interactions related by causality. As used herein, the term transaction is used in a different way than what is sometimes defined in the context of databases or atomic actions. By way of example, a transaction may include a sequence of messages and invocations initiated by an action such as, for example, booting up a machine. A transaction typically passes through one or more components and may branch off. Therefore, the structure of a transaction may be a tree. One or more embodiments of the invention process a set of transactions as trees and categorize them into groups or subsets.

One skilled in the relevant art will appreciate that it is possible to use similar algorithms to extract patterns from a large amount of interactions recorded by the interaction observer 418. An exemplary result of a pattern extraction is illustrated on the right side 595 of FIG. 5.

Figure 6:
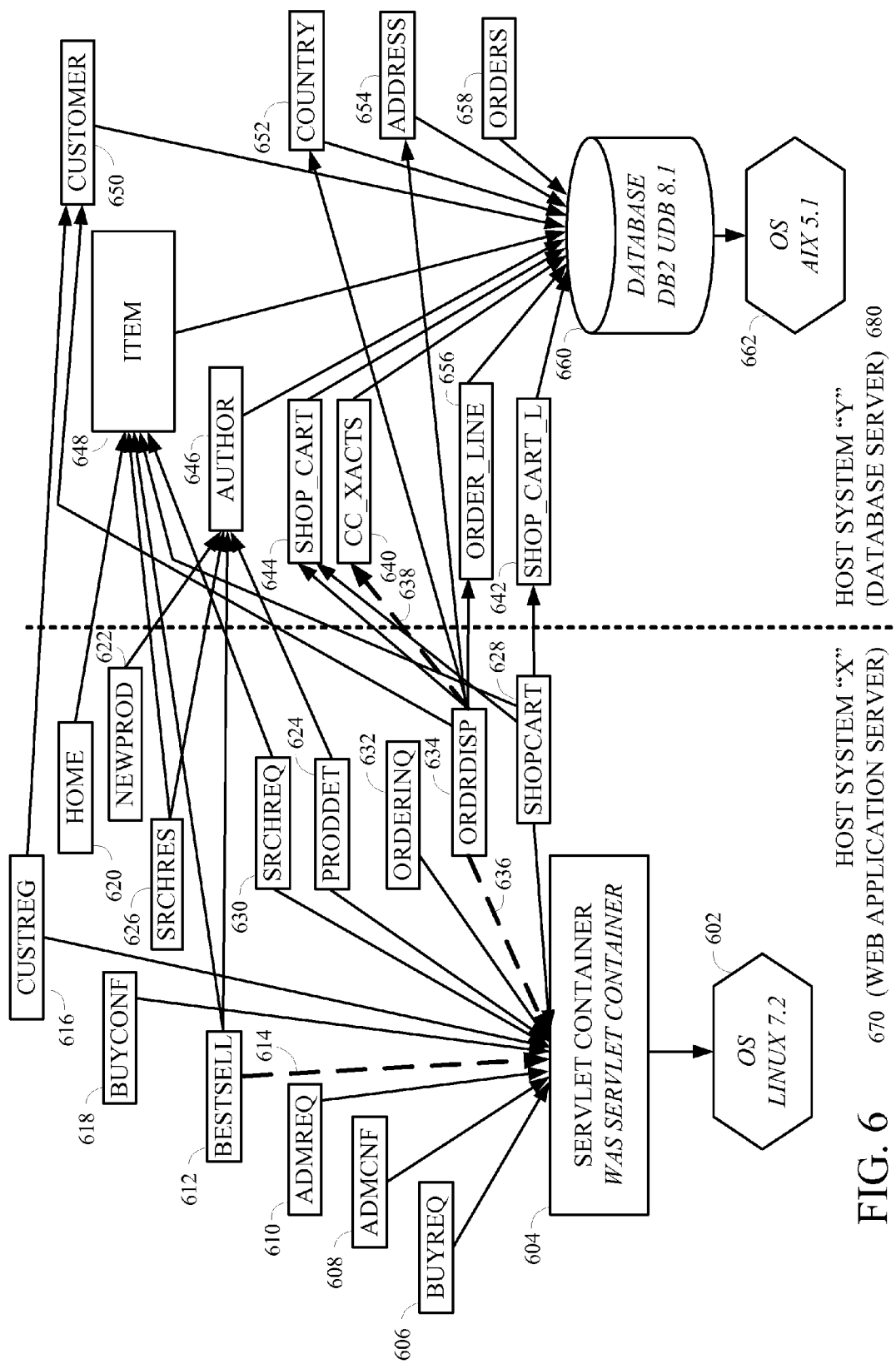
FIG. 6 is a diagram illustrating the generated topology as well as the dependency relationships of an electronic-commerce (e-Commerce) application system, according to an embodiment of the present invention.

FIG. 6 is a diagram illustrating the generated topology as well as the dependency relationships of an electronic-commerce (e-Commerce) application system, according to an embodiment of the present invention. Such a relationship model focuses on software components and their logical (for example, modules and components) and physical (for example, files and shared libraries) architecture. The relationship model illustrated in FIG. 6 has been obtained by running the observed interactions through the interaction pattern detector 420. Subsequently, the deployment descriptor generator 426 will build the dependency graph from the identified interaction pattern.

By way of example, FIG. 6 depicts that computing system "X" 670 plays the role of a web application server and hosts a number of components described below. The electronic-enterprise (e-enterprise) application, which may, for example, be implemented by a total of 14 servlets. Servlets may include, for example, BuyRequest (buyreq) 606, AdministratorConfiguration (admcnf) 608, AdministratorRequest (admreq) 610, BestSellers (bestsell) 612, BuyConfirmation (buyconf) 618, CustomerRegistration (custreg) 616, home 620, NewProducts (newprod) 622, ProductDetails (proddet) 624, SearchResults (srchres) 626, ShoppingCart (shopcart) 628, SearchRequest (srchreq) 630, OrderInquiry (orderinq) 632 and OrderDisplay (ordrdisp) 634. As illustrated in the example of FIG. 6, each servlet corresponds to a possible transaction on a website. For example, the specific example website used in FIG. 6 is a bookseller's web storefront, but one or more embodiments of the present invention could be used with any other (web) application. By way of example, some of the servlets may encapsulate the business logic of the application.

The servlet container 604 may be implemented, for example, by IBM WebSphere Application Server (WAS) servlet container. The operating system (OS) 602 may be, for example, Linux version 7.2.

Computing system "Y" 680 plays the role of a database server and can host a variety of components, as described below. In one embodiment of the present invention, the components may include ten database tables. Database tables may include, for example, credit card transaction table (cc_xacts) 640, ShoppingCartLineItem (shop_cart_L) 642, ShoppingCart (shop_cart) 644, author 646, item 648, customer 650, country 652, address 654, OrderLineItem (order_line) 656 and orders 658. Database tables may, for example, hold the data accessed by the servlets.

In one or more embodiments of the present invention, the database tables reside within a database 660 implemented, for example, by (IBM) DB2 Universal Database (UDB) version 8.1, and also within an operating system (OS) 662, such as, for example, (IBM) Advanced Interactive Executive (AIX) version 5.1.

A request may be submitted, for example, by an administrator to the deployment descriptor generator 426 specifying that two servlets, BestSellers (bestsell) 612 and OrderDisplay (ordrdisp) 634 need to be installed on Host System "X" 670. This is one example of building a deployment descriptor for a partial system as only a subset of the overall distributed system considered for the construction of the deployment descriptor.

In one or more embodiments of the invention, it may be assumed that the operating system 602 is already present on host system "X" 670. In addition, it may be assumed that operating system 662 is already present on host system "Y" 680. Also, in one or more embodiments of the invention, it is assumed that the change management system is subject to an operational policy stating that a servlet container must be installed on a different system than a database (that is, ex-location constraint).

The invocation of the deployment descriptor generator 426 for a request yields one or more dependencies. By way of example, various dependencies are depicted in FIG. 6 by dashed lines. For example, as illustrated in FIG. 6, the bestsell servlet 612 depends only on the servlet container 604 on host system "X" 670. This dependency is illustrated by the arrow labeled 614. The ordrdisp servlet 634, in contrast, depends on both the servlet container 604 on host system "X" 670 as well as on the credit card transaction table (CC_XACTS) 640 on host system "Y" 680. The former dependency is illustrated by the arrow labeled 636, and the latter dependency is illustrated by the arrow labeled 638. Consequently, in the exemplary depiction of FIG. 6, it would be advantageous to create a CADD for the following components by taking into account that they need to be installed on two or more systems: bestsell servlet 612, ordrdisp servlet 634, servlet container 604, CC_XACTS table 640 and database 660.

Figure 7:
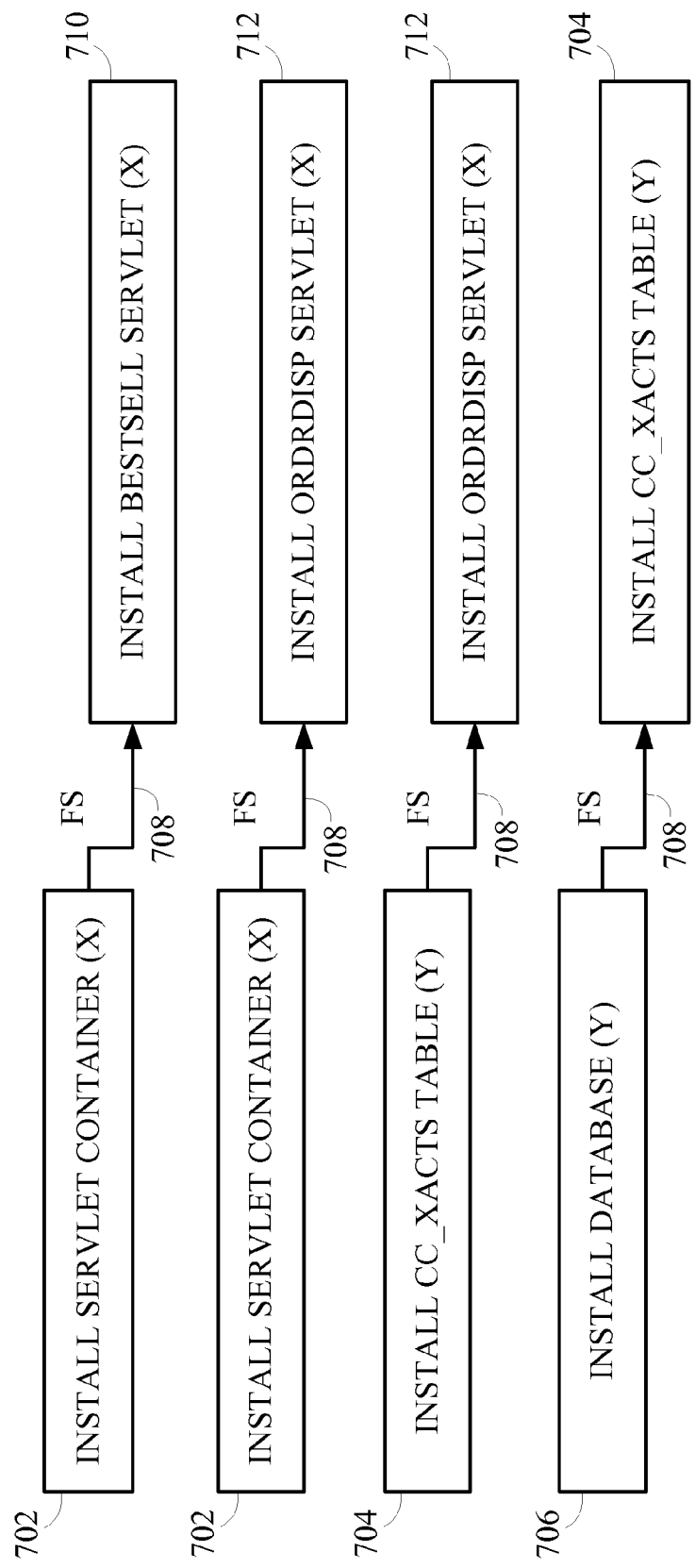
FIG. 7 is a diagram illustrating task relationships and relationship constraints, according to an embodiment of the present invention.

We now turn to FIG. 7, which is a diagram illustrating task relationships and relationship constraints, according to an embodiment of the present invention. In one or more embodiments of the invention, a dependency model is needed in a granularity that specifies the one or more components required by each individual component. As such information is often not directly available, the deployment descriptor generator 426 generates this information as described below. The deployment descriptor generator 426 invokes the interaction observer 418 as well as the interaction pattern detector 420. The deployment descriptor generator 426 also transforms the obtained interaction pattern into a dependency graph, and also transforms the obtained interaction pattern into a CADD.

Different change management operations require different traversals through the dependency model. By way of example and not limitation, a request for a new installation of a component leads the deployment descriptor generator 426 to determine which components must already be present before a new component can be installed. On the other hand, for example, a request for an update, or an uninstall of a component will result in determining the components that will either be impacted by the change or which need to be removed first to preserve the integrity of the system. FIG. 7, by way of example, illustrates the precedence and location constraints for an install-type change management operation, as in this example it is assumed that an installation has been requested. Different task relationships are generated for uninstall-type task relationships if the administrator requests the construction of an uninstallation.

By way of another example, if an installation change management operation needs to be carried out, the consideration of the results of the relationship traversal (carried out by the deployment descriptor generator 426) yields that the tasks described below are subject to relationship constraints.

The "installation of the servlet container on host system 'X'" task 702 must be finished ("FS" type relationship constraint) 708 before the "installation of the bestsell servlet on host system 'X'" task 710 can be started.

The "installation of the servlet container on host system 'X'" task 702 must be finished ("FS" type relationship constraint) 708 before the "installation of the ordrdisp servlet on host system 'X'" task 712 can be started.

The "installation of the CC_XACTS table on host system 'Y'" task 704 must be finished ("FS" type relationship constraint) 708 before the "installation of the ordrdisp servlet on host system 'X'" task 712 can be started.

The "installation of the database on host system 'Y'" task 706 must be finished ("FS" type relationship constraint) 708 before the "installation of the CC_XACTS table on host system 'Y'" task 704 can be started.

One having skill in the art will recognize that modifications in the way the task relationships are structured, the way in which order the antecedents and dependents appear therein, as well as the way in which they are represented, may be made without departing from the spirit and scope of the present invention. In particular, the fields "antecedent," "change management operation," "precedence constraint," "dependent" and "location constraint" may be written as a data structure corresponding to a quintuple, or 5-tuple.

Figure 8:
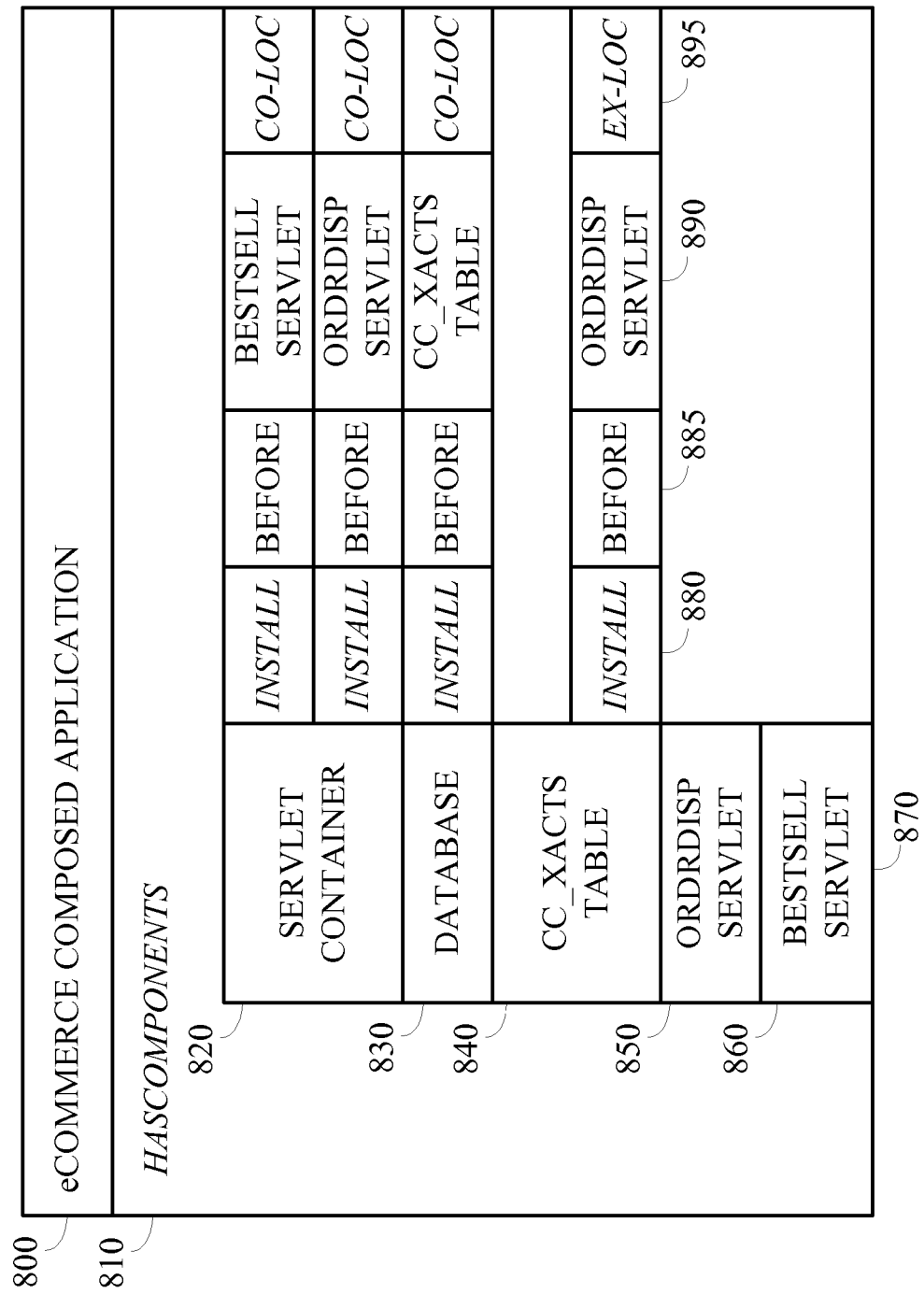
FIG. 8 is a diagram illustrating a composed application deployment descriptor (CADD), according to an embodiment of the present invention.

FIG. 8 illustrates a composed application deployment descriptor (CADD) for installing the bestsell and ordrdisp servlets of the e-Commerce composed application 800, according to an embodiment of the present invention. The existence of a dependency between two components indicates that a relationship (for example, FS, SS, FF, and/or SF) constraint and/or a location constraint (for example, a policy forbidding co-location of database and servlet container) exists between the dependent and the antecedent. In one or more embodiments of the present invention, it is assumed that the task relationships discussed above are given as a quintuple, or 5-tuple, containing the fields "antecedent" 870, "change management operation 880, "precedence constraint" 885, "dependent" 890 and "location constraint" 895. A quintuple corresponds to a row in FIG. 8.

In one or more embodiments of the invention, the deployment descriptor generator observes rules as described below.

The outermost container that assembles all aggregated components is a composed application 800. It contains identifying and descriptive information about the composed application and all of its aggregated components by way of the "HasComponents" relationship 810. As illustrated in FIG. 8, we can see by looking at column 870, that the composed application aggregates five different components. In a preferred embodiment, column 870 contains identifying and descriptive information for each of the aggregated subcomponents. Further, in a preferred embodiment, "HasComponents" relationships can be nested, that is, each of the aggregated components may itself aggregate further components by way of one or more "HasComponent" relationships, in order to reflect deeper containment hierarchies.

Any component may have zero or more incoming and outgoing relationship constraints. For example, a component can simultaneously play the role of antecedent and dependent. In FIG. 8, this is exemplified by the "CC_XACTS Table," which is a dependent component (row 830 and column 890) of the "Database" component as well as an antecedent (row 840 and column 870) of the "ordrdisp Servlet."

If a component is the antecedent of several other different components, a "before" precedence constraint (column 885) is appended, as illustrated in FIG. 8, to the "INSTALL" change management operation (column 880) for every dependent component, as in the example of the 'Servlet Container' 820.

If components are residing on different hosts, an "ex-loc" location constraint is placed in column 895. For co-located components, a "co-loc" location constraint is inserted in column 895.

If a component is a dependent of potentially several other different components, it is included in column 890, preferably by way of a reference to column 870 in order to avoid duplicate information.

For purposes of completeness, rows 850 and 860 may include the "ordrdisp Servlet" component and the "bestsell Servlet" component, respectively.

By following the above rules, the deployment descriptor generator 426 is able to consolidate the component relationships depicted in FIG. 7 into a composed application deployment descriptor.

Without loss of generality, we note that similar logic can be applied to UNINSTALL-type operations. In addition, one or more embodiments of the present invention are capable of producing a deployment descriptor for a set of change management operations (for example, install, start, stop, uninstall, configure, etc.) in order to address the construction of a CADD that accounts for the full lifecycle of all involved components. One having skill in the art will recognize that modifications in the way the CADD is structured and in which order antecedents and dependents appear in it, as well as their representation, may be made without departing from the spirit and scope of the present invention. For example, a semantically identical representation of row 830 is to name the dependent first in column 870, to change the precedence constraint to "after" in column 885 and insert the antecedent in column 890. In addition, a precedence constraint may be in the form of FF, SS, SF, or FS instead of using the more conversational "before" used for illustrative purposes in FIG. 8.

Figure 9:
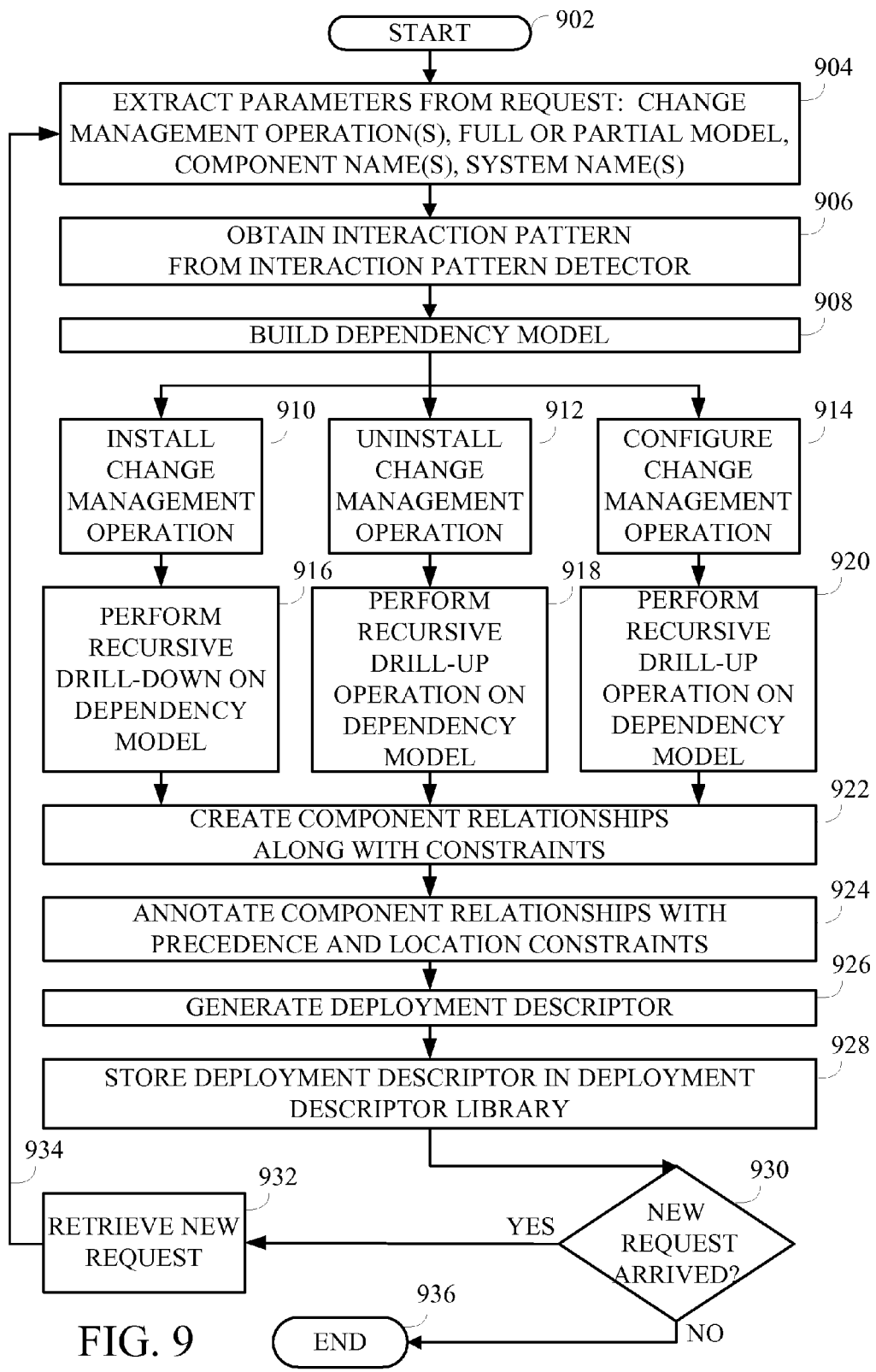
FIG. 9 is a flow diagram illustrating techniques for constructing a deployment descriptor, according to an embodiment of the present invention.

We now turn to FIG. 9, which is a flow diagram illustrating techniques for constructing a deployment descriptor, according to an embodiment of the present invention. In one or more embodiments of the invention, the algorithm begins at step 902 and includes additional steps as described below. Upon receipt of a new request, the deployment descriptor generator extracts the relevant parameters from the request in step 904. Examples of a parameter may include whether the construction of a deployment descriptor for the entire distributed computing system is requested, or whether the request applies only to parts of the overall system. Additional exemplary parameters may include the name of the component or components that need to be changed, the computing system names, and the change management operation or operations.

In one or more embodiments of the present invention, an administrator can specify a list of one or more change management operations in the request so that the generated CADD includes relationship specifications that account for the full lifecycle (for example, install, uninstall, start, stop, etc.) of all components that are aggregated into a composed application.

The interaction pattern is obtained from the interaction pattern detector in step 906 and transformed into a dependency model in step 908. Different procedures are applied according to the type of change management operation specified in the request submitted by the administrator. For example, a request may specify an install change management operation in step 910, an uninstall change management operation in step 912, or a configure change management operation in step 914. One skilled in the relevant art will recognize that modifications and extensions of the change management operations may be made without departing from the spirit and scope of the invention.

In the example of a request specifying an install change management operation in step 910, the deployment descriptor generator would perform a recursive drill-down operation on the dependency model in step 916. A list of components to be installed would be returned as well.

In the example of a request may specify an uninstall change management operation in step 912, the deployment descriptor generator would perform a recursive drill-up operation on the dependency model in step 918 to retrieve a list of components that would be impacted by the update change management operation.

In the example of a request may specify a configure change management operation in step 914, the deployment descriptor generator would perform a recursive drill-up operation on the dependency model in step 920 to retrieve a list of components that would be impacted by the configure change management operation.

Depending on what change management operation is specified in the request, the deployment descriptor generator would also create the task relationships as well as the relationship constraints in step 922 from the data contained in the dependency model. The deployment descriptor generator also annotates the component relationships with precedence and locations constraints in step 924, as well as generating a deployment descriptor in step 926. The deployment descriptor is persistently stored in the deployment descriptor library in step 928 and returned to the administrator for further processing.

Also, the deployment descriptor generator may verify whether one or more new requests have arrived in step 930 for which the procedure needs to be repeated. If a new request has arrived, one or more embodiments of the invention will retrieve a new request in step 932 and transition via step 934 to step 904. If a new request has not arrived, one or more embodiments of the present invention will end at step 936.

Figure 10:
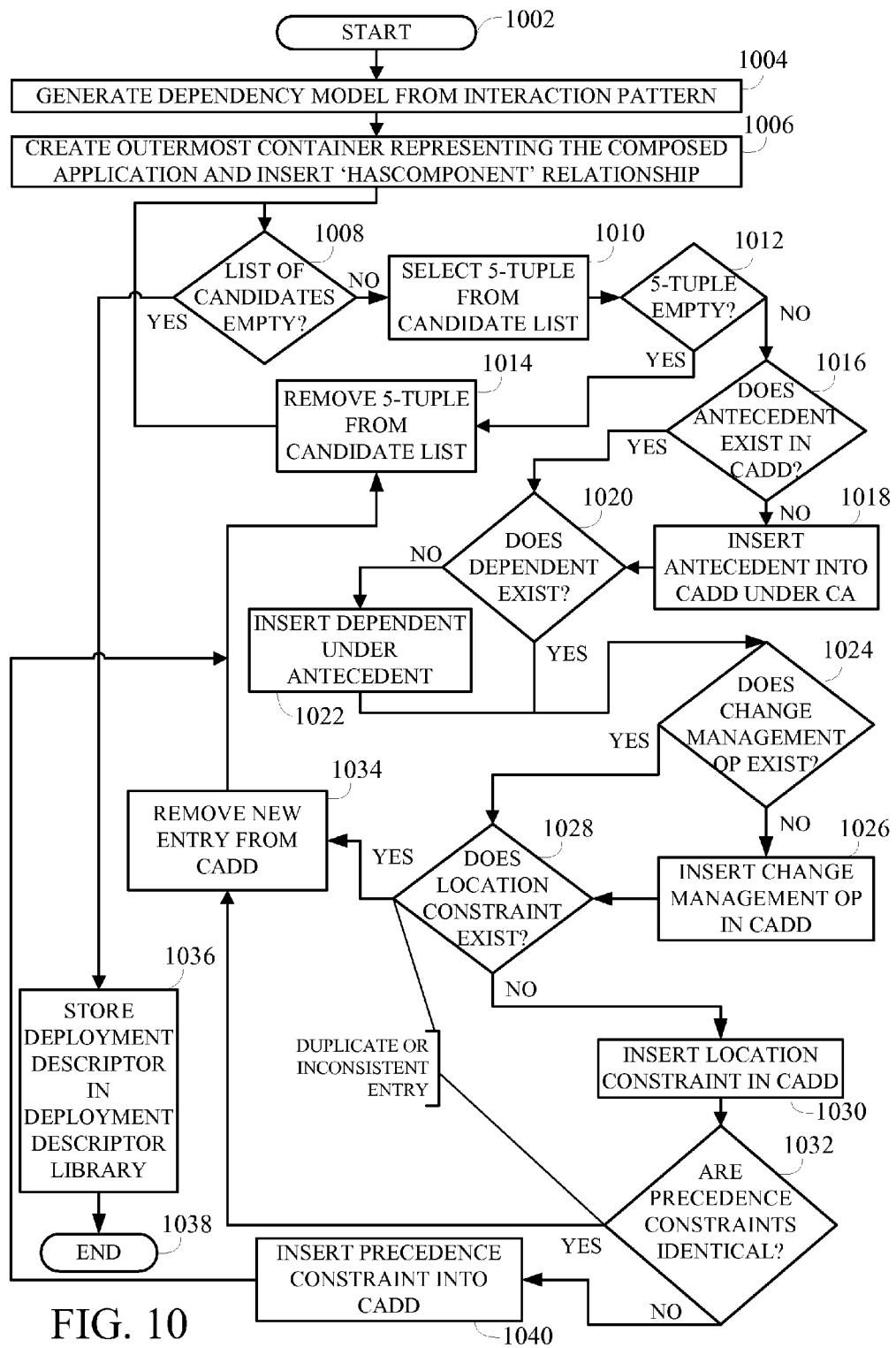
FIG. 10 is a flow diagram illustrating techniques for constructing a deployment descriptor from dependency information, according to an embodiment of the present invention.

FIG. 10 is a flow diagram illustrating techniques for constructing a deployment descriptor from dependency information, according to an embodiment of the present invention. In one or more embodiments of the invention, the algorithm begins at step 1002 and includes various additional steps as described below. An interaction pattern is obtained from the interaction pattern detector and is transformed into a dependency model in step 1004. The outermost container of a CADD (representing the composed application itself) is created and the initial "HasComponent" relationship is inserted in step 1006, which will scope all other elements of a CADD that will be subsequently inserted.

In one or more embodiments of the present invention, the dependency model contains a list of component 5-tuples. The overall list of 5-tuples is referred to herein as a candidate list. In one or more embodiments of the invention, it is assumed that every 5-tuple contains first the antecedent, and then the dependent component, each prefixed with the name of the change management operation the administrator has specified in the request. Every 5-tuple includes the antecedent, the change management operation, the precedence constraint (for example, FS, SS, SF and FF), the dependent and a location constraint. One skilled in the art will recognize that modifications and extensions to the way the dependency graph is represented may be made without departing from the spirit and scope of the invention.

As illustrated in FIG. 10, one or more embodiments of the invention determine if the list of candidates is empty (that is, no 5-tuples are present) in step 1008. If the list of candidates contains one or more 5-tuples, a 5-tuple is selected from the candidate list in step 1010. No assumptions are being made with respect to the order of the 5-tuples in the candidate list. Also, the 5-tuple selection can happen in any order, since the candidate list is essentially an unordered set of 5-tuples.

One or more embodiments of the present invention also determine if the 5-tuple is empty (that is, no elements are present) in step 1012. If the 5-tuple is empty, the 5-tuple is removed from the candidate list in step 1014. If the 5-tuple is not empty, the algorithm selects an antecedent from the 5-tuple and proceeds with determining if the antecedent already exists in the CADD in step 1016. If the antecedent does not exist in the CADD, the antecedent is inserted into the CADD under the scope of the composed application in step 1018. One or more embodiments of the invention also determine if the dependent from the 5-tuple already exists within the scope of the antecedent in step 1020.

If the dependent does not exist within the scope of the antecedent, the algorithm creates an entry for the dependent within the scope of the antecedent in step 1022 and subsequently proceeds with determining if the change management operation already exists within the scope of the antecedent and dependent in step 1024. If change management operation does not already exist within the scope of the antecedent and dependent, the change management operation is accordingly inserted in the CADD in step 1026. Then, the algorithm checks for a duplicate or inconsistent entry for the location constraint by determining if a location constraint already exists within the scope of the antecedent the dependent and the change management operation in step 1028.

From the existence of a location constraint alone in the appropriate scope, the algorithm can safely assume that either a duplicate or inconsistent entry is present and proceeds directly with removing the already created parts of the new entry in step 1034 and subsequently removes the 5-tuple altogether from the candidate list in step 1014. If, however, no location constraint is present in the CADD, the algorithm proceeds to step 1030 and inserts the location constraint in the CADD. Then, the algorithm carries out its last check in step 1032 by verifying if, for a given entry, the precedence constraints are identical. If the precedence constraints are identical, an inconsistent entry is detected, which yields the algorithm to proceed to step 1034, which removes the new entry from the CADD. Otherwise, the algorithm proceeds to step 1040 and inserts the new precedence constraint into the CADD before continuing at step 1014 with the removal of the already processed 5-tuple from the candidate list.

In one or more embodiments of the invention, the algorithm proceeds to step 1008 and determines if the procedure needs to be repeated for one or more additional 5-tuples contained in the candidate list. If, however, no more 5-tuples remain for processing (that is, the list of candidates is empty), the completed deployment descriptor is stored in the deployment descriptor library in step 1036. The algorithm ends at step 1038.

The following table depicts examples of deployment descriptor generator application programming interfaces (APIs). The table includes base APIs that can generate, send and request receipt of partial orders of change management tasks for a given service and host name. Those skilled in the art will appreciate that the APIs can use one or more parameters (either shown, not shown, or in any combination thereof) to identify characteristics (as, for example, specified in the Functional Description) used by the APIs.

Specifically, the constructDeploymentDescriptorForInstall(parameters) API builds the deployment descriptor for the install change management operation based on a recursive "drill-down", and carried out by the dependency service. The constructDeploymentDescriptorForUpdate(parameters) API builds the deployment descriptor for the update change management operation by invoking a recursive "drill-up" on the dependency service. That is, it retrieves all the dependents of a given component (for example, the components in the dependency hierarchy that are likely to be affected by an update change management operation). The constructDeploymentDescriptorForUninstall(parameters) API builds the deployment descriptor for the uninstall change management operation. The constructDeploymentDescriptorForRollback(parameters) API builds the deployment descriptor for the rollback change management operation, which is the opposite operation of update and restores the previously updated version of a component. The constructDeploymentDescriptorForInitialConfigure(parameters) API builds the deployment descriptor for the initial-configure change management operation, which applies basic configuration settings to a component, which are needed to install it in the first place. The constructDeploymentDescriptorForConfigure(parameters) API builds the deployment descriptor for the configure change management operation, which applies advanced configuration settings to a component so that it can be customized.

pattern to create at least one relationship specification, wherein the at least one relationship specification is useable for managing the at least one distributed computing system.

One or more embodiments of the present invention may also include associating the at least one relationship specification with at least one component. In one or more embodiments of the present invention, associating the at least one relationship specification with at least one component may include inserting a relationship specification into for example, a software package, associating the relationship specification with a newly-created service, and shipping the relationship specification on a compact disc (CD) with a hardware component. The step of creating at least one relationship specification may also include creating at least one relationship specification for consumption of at least one of software installers and service provisioning systems.

In one or more embodiments of the present invention, the step of consolidating the at least one interaction into at least one interaction pattern includes taking into account a component containment hierarchy and at least one relationship between the two or more components. A component contain-

| APIs | Functional Description |
|---|---|
| constructDeploymentDescriptorForInstall( ) | Deployment descriptor for the install change management operation is built. The activities in a workflow (for example, process, flow, sequence, etc.) are created and populated with values from the dependency model. |
| constructDeploymentDescriptorForUpdate( ) | Deployment descriptor for the update change management operation is built. The activities in a workflow (for example, process, flow, sequence, etc.) are created and populated with values from the dependency model. |
| constructDeploymentDescriptorForUninstall( ) | Deployment descriptor for the uninstall change management operation is built. The activities in a workflow (for example, process, flow, sequence, etc.) are created and populated with values from the dependency model. |
| constructDeploymentDescriptorForRollback( ) | Deployment descriptor for the rollback change management operation is built. The activities in a workflow (for example, process, flow, sequence, etc.) are created and populated with values from the dependency model. |
| constructDeploymentDescriptorForInitialConfigure( ) | Deployment descriptor for the initial-configure change management operation is built. The activities in a workflow (for example, process, flow, sequence, etc.) are created and populated with values from the dependency model. |
| constructDeploymentDescriptorForConfigure( ) | Deployment descriptor for the configure change management operation is built. The activities in a workflow (for example, process, flow, sequence, etc.) are created and populated with values from the dependency model. |

Figure 11:
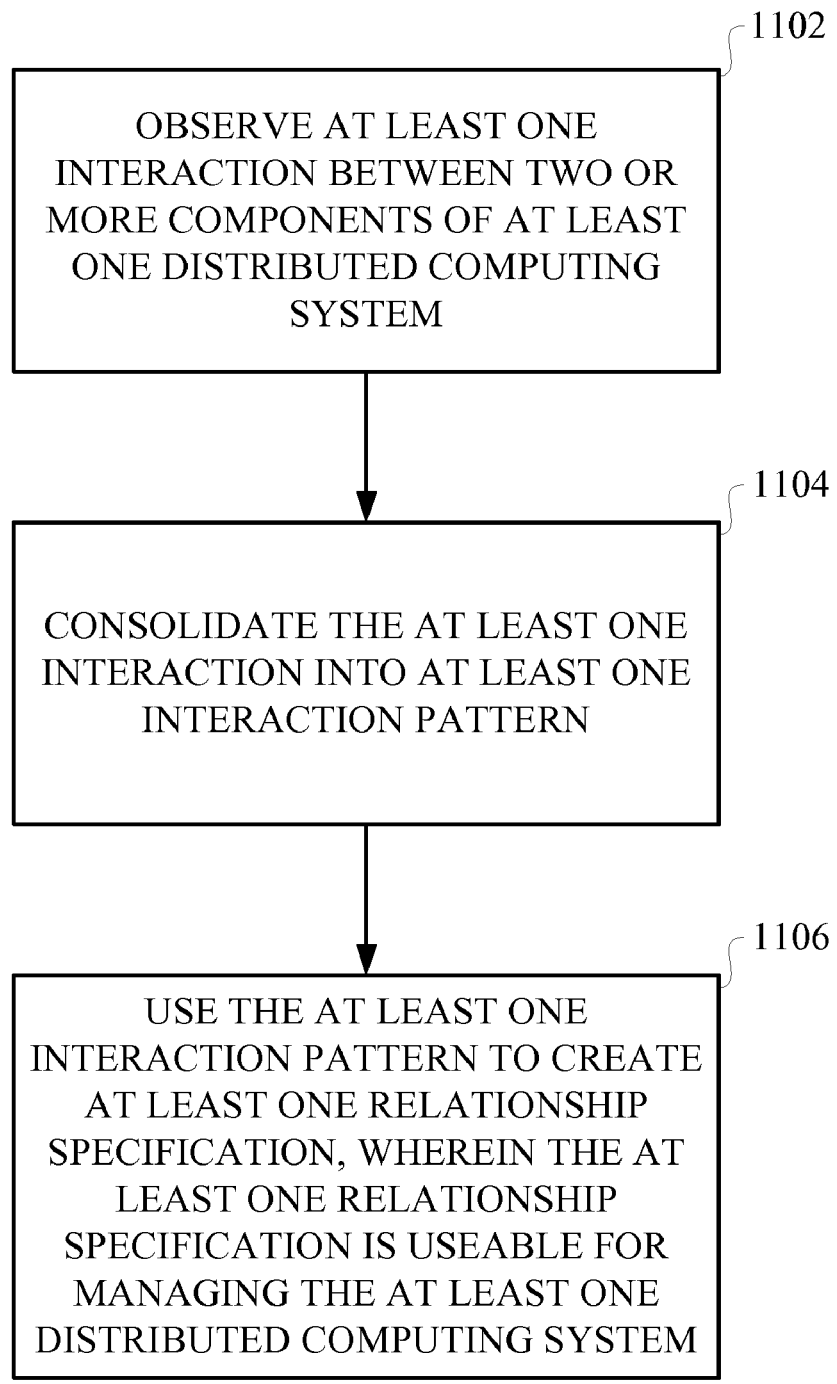
FIG. 11 is a flow diagram illustrating techniques for automatically creating at least one relationship specification, according to an embodiment of the present invention.

FIG. 11 is a flow diagram illustrating techniques for automatically creating at least one relationship specification, according to an embodiment of the present invention. Step 1102 includes observing at least one interaction between two or more components of at least one distributed computing system. The step of observing at least one interaction between two or more components of at least one distributed computing system may be, in one or more embodiments of the present invention, performed at run-time. Step 1104 includes consolidating the at least one interaction into at least one interaction pattern. Step 1106 includes using the at least one interaction ment hierarchy and at least one relationship between the two or more components may be expressed, for example, as at least one of a manifest file and a deployment descriptor. Also, in one or more embodiments of the invention, a component containment hierarchy and at least one relationship between the two or more components are stored in a global system configuration repository that addresses at least one of the following: one or more different packaged software products, one or more services, one or more software components, one or more service components and one or more computing systems. Additionally, components (for example, software products or services, middleware, hardware etc.) may be located on the same system or located on different systems.

In one or more embodiments of the present invention, the techniques may include the steps including the at least one relationship specification in at least one of an installable package and/or media in the form of at least one deployment descriptor, a local repository as a relationship model, and a global repository as a relationship model. Also, in one or more embodiments of the present invention, the deployment descriptors are the means by which dependencies are expressed, and may contain both containment hierarchy and relationships. The deployment descriptors may, for example, be associated with one or more components and provide meta-information about the components, such as, for example, dependencies, identification, version info etc. Additionally, the deployment descriptors may, for example, be consumed by installers and/or provisioning systems to enable it to carry out prerequisite and/or compatibility validity checks whenever a request for change is submitted. Also, once the software is deployed and/or installed, the topology of the installed application is persisted in, for example, a global or local system configuration repository along with predefined information on how to uninstall the entire system. In one or more embodiments of the invention, this information is in the generated deployment descriptor as well. In a preferred embodiment of the invention, the relationship specification may either be included on an installation media (CD) in the form of a deployment descriptor or in a local/global repository as an object and/or relationship model.

Figure 12:
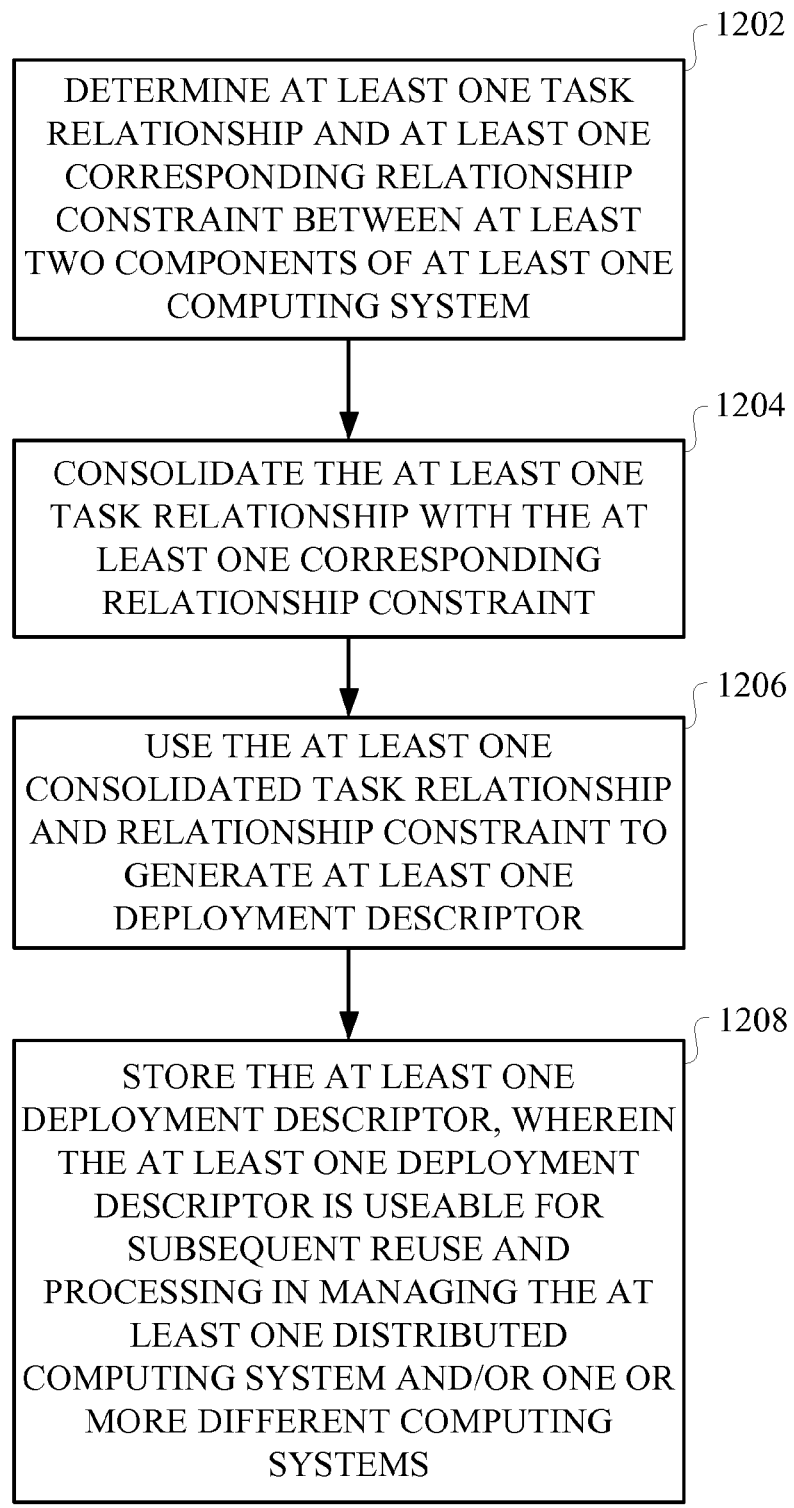
FIG. 12 is a flow diagram illustrating techniques for storing at least one deployment descriptor for subsequent reuse and processing, according to an embodiment of the present invention.

Also, one or more embodiments of the invention may be performed within an integrated development environment (IDE), or may also be performed within a hosting environment. Additionally, in one or more embodiments of the present invention, the at least one relationship specification comprises at least one of a name of at least one component and a 5-tuple comprising one or more fields representing one or more of an antecedent, a change management operation, a precedence constraint, a dependent, and a location constraint FIG. 12 is a flow diagram illustrating techniques for storing at least one created relationship specification for subsequent reuse and processing, according to an embodiment of the present invention. Step 1202 includes determining at least one task relationship and at least one corresponding relationship constraint between at least two components of at least one computing system. Step 1204 includes consolidating the at least one task relationship with the at least one corresponding relationship constraint. Step 1206 includes using the at least one consolidated task relationship and relationship constraint to generate at least one deployment descriptor. Step 1208 includes storing the at least one deployment descriptor, wherein the at least one deployment descriptor is useable for subsequent reuse and processing in managing the at least one distributed computing system and/or one or more different computing systems.

In one or more embodiments of the invention, the at least one deployment descriptor is stored in a deployment descriptor library.

A variety of techniques, utilizing dedicated hardware, general purpose processors, firmware, software, or a combination of the foregoing may be employed to implement one or more embodiments of the present invention. One or more embodiments of the invention can be implemented in the form of a computer product including a computer useable medium with computer useable program code for performing the method steps indicated. Furthermore, one or more embodiments of the invention can be implemented in the form of an apparatus including a memory and at least one processor that is coupled to the memory and operative to perform exemplary method steps.

Figure 13:
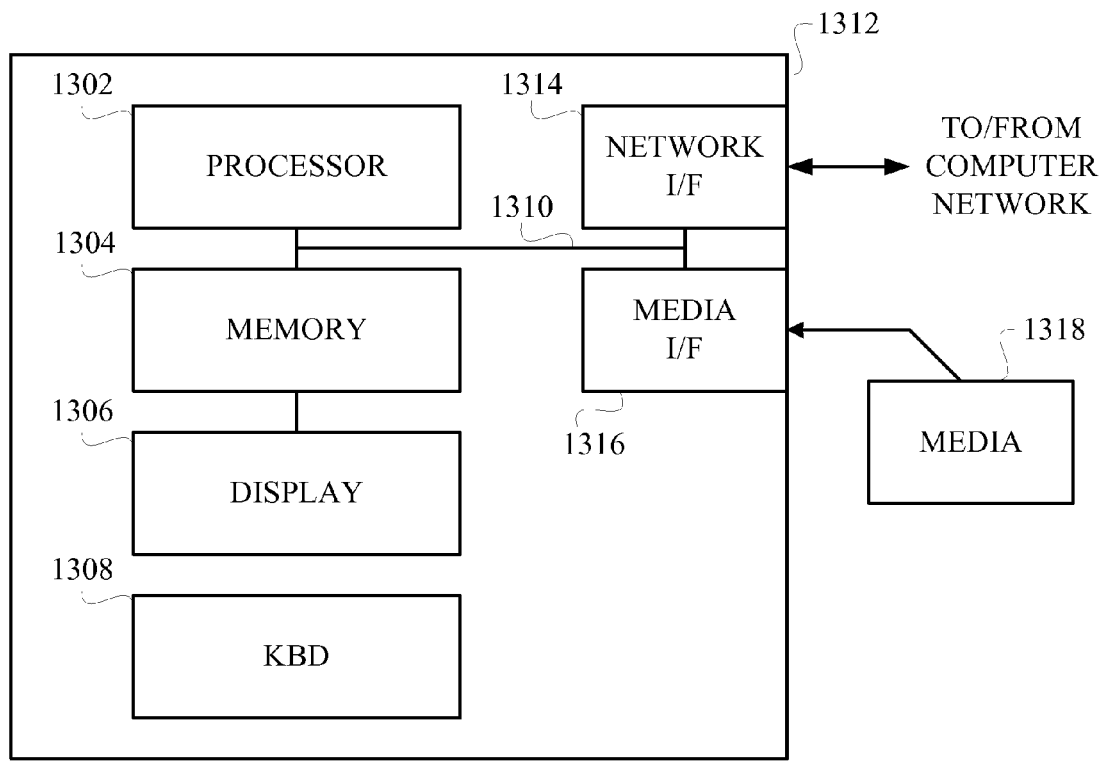
FIG. 13 is a system diagram of an exemplary computer system on which one or more embodiments of the present invention can be implemented.

One implementation of the present invention makes substantial use of software running on a general purpose computer or workstation. With reference to FIG. 13, such an implementation might employ, for example, a processor 1302, a memory 1304, and an input and/or output interface formed, for example, by a display 1306 and a keyboard 1308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 1302, memory 1304, and input and/or output interface such as display 1306 and keyboard 1308 can be interconnected, for example, via bus 1310 as part of a data processing unit 1312. Suitable interconnections, for example via bus 1310, can also be provided to a network interface 1314, such as a network card, which can be provided to interface with a computer network, and to a media interface 1316, such as a diskette or CD-ROM drive, which can be provided to interface with media 1318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-useable or computer-readable medium (for example, media 1318) providing program code for use by or in connection with a computer or any instruction execution system. For the purposes of this description, a computer useable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 1304), magnetic tape, a removable computer diskette (for example media 1318), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 1302 coupled directly or indirectly to memory elements 1304 through a system bus 1310. The memory elements can include local memory employed during actual execution of the program code, bulk storage, and cache memories which provide temporary storage of at least some program code in order to reduce the number of times code is retrieved from bulk storage during execution.

Input and/or output or I/O devices (including but not limited to keyboards 1308, displays 1306, pointing devices, and the like) can be coupled to the system either directly (such as via bus 1310) or through intervening I/O controllers (omitted for clarity).

Network adapters such as network interface 1314 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for automatically creating at least one relationship specification, the method comprising the steps of:
    observing and capturing at least one interaction between two or more components of at least one distributed computing system at run-time;
    consolidating the at least one interaction into at least one interaction pattern; and
    using the at least one interaction pattern to create at least one relationship specification, wherein the at least one relationship specification is useable for managing the at least one distributed computing system;
    wherein the interaction pattern between the two or more components comprises at least one causal relationship between interactions of the two or more components, wherein the at least one causal relationship between a first interaction and a second interaction comprises a relationship in which the first interaction causes an event on the at least one distributed computing system in a same thread as the second interaction on the at least one distributed computing system.

2. The method of claim 1, further comprising the step of associating the at least one relationship specification with at least one component.

3. The method of claim 1, wherein the step of using the at least one interaction pattern to create at least one relationship specification comprises creating at least one relationship specification for consumption of at least one of software installers and service provisioning systems.

4. The method of claim 1, wherein the step of consolidating the at least one interaction into at least one interaction pattern comprises taking into account a component containment hierarchy and at least one relationship between the two or more components.

5. The method of claim 4, wherein the component containment hierarchy and at least one relationship between the two or more components are expressed as at least one of a manifest file and a deployment descriptor.

6. The method of claim 4, wherein the component containment hierarchy and the at least one relationship between the two or more components are stored in a global system configuration repository that addresses at least one of:
    one or more different packaged software products, one or more services, one or more software components, one or more service components and one or more computing systems.

7. The method of claim 1, wherein the two or more components are located on the same system.

8. The method of claim 1, wherein the two or more components are located on different systems.

9. The method of claim 1, wherein the step of observing at least one interaction between two or more components comprises observing at least one interaction between two or more components at run-time.

10. The method of claim 1, further comprising the step of:
    including the at least one relationship specification in at least one of an installable package and/or media in the form of at least one deployment descriptor, a local repository as a relationship model, and a global repository as a relationship model.

11. The method of claim 1, wherein the steps are performed within an integrated development environment (IDE).

12. The method of claim 1, wherein the steps are performed within a hosting environment.

13. The method of claim 1, wherein the at least one relationship specification comprises at least one of a name of at least one component and a 5-tuple comprising one or more fields representing one or more of an antecedent, a change management operation, a precedence constraint, a dependent, and a location constraint.

14. An apparatus for automatically creating at least one relationship specification, comprising:
    a memory; and
    at least one processor coupled to the memory and operative to:
        observe and capture at least one interaction between two or more components of at least one distributed computing system at run-time;
        consolidate the at least one interaction into at least one interaction pattern; and
        use the at least one interaction pattern to create at least one relationship specification, wherein the at least one relationship specification is useable for managing the at least one distributed computing system;
        wherein the interaction pattern between the two or more components comprises at least one causal relationship between interactions of the two or more components, wherein the at least one causal relationship between a first interaction and a second interaction comprises a relationship in which the first interaction causes an event on the at least one distributed computing system in a same thread as the second interaction on the at least one distributed computing system.

15. The apparatus of claim 14, wherein the at least one processor is further operative to associate the at least one relationship specification with at least one component.

16. The apparatus of claim 14, wherein the at least one processor is operable to create at least one relationship specification for consumption of at least one of software installers and service provisioning systems.

17. The apparatus of claim 14, wherein the at least one processor is operable to consolidate the at least one interaction into at least one interaction pattern taking into account a component containment hierarchy and at least one relationship between the two or more components.

18. The apparatus of claim 17, wherein the component containment hierarchy and at least one relationship between the two or more components are expressed as at least one of a manifest file and a deployment descriptor.

19. The apparatus of claim 17, wherein the component containment hierarchy and the at least one relationship between the two or more components are stored in a global system configuration repository that addresses at least one of:
   one or more different packaged software products, one or more services, one or more software components, one or more service components and one or more computing systems.

20. The apparatus of claim 14, wherein the at least one processor is operable to observe at least one interaction between two or more components at run-time.

21. The apparatus of claim 14, wherein the at least one processor is further operable to:
   include the at least one relationship specification in at least one of an installable package and/or media in the form of at least one deployment descriptor, a local repository as a relationship model, and a global repository as a relationship model.

22. The apparatus of claim 14, wherein the at least one processor is operable to perform within an integrated development environment (IDE).

23. The apparatus of claim 14, wherein the at least one processor is operable to perform within a hosting environment.

24. A computer program product comprising a computer readable storage medium having computer useable program code for automatically creating at least one relationship specification, the computer program product including:
   computer useable program code for observing and capturing at least one interaction between two or more components of at least one distributed computing system at run-time;
   computer useable program code for consolidating the at least one interaction into at least one interaction pattern; and
   computer useable program code for using the at least one interaction pattern to create at least one relationship specification, wherein the at least one relationship specification is useable for managing the at least one distributed computing system;
   wherein the interaction pattern between the two or more components comprises at least one causal relationship between interactions of the two or more components, wherein the at least one causal relationship between a first interaction and a second interaction comprises a relationship in which the first interaction causes an event on the at least one distributed computing system in a same thread as the second interaction on the at least one distributed computing system.

25. The computer program product of claim 24, further including computer useable program code for:
   associating the at least one relationship specification with at least one component.

26. The computer program product of claim 24, wherein the computer useable program code for using the at least one interaction pattern to create at least one relationship specification comprises creating at least one relationship specification for consumption of at least one of software installers and service provisioning systems.

27. The computer program product of claim 24, wherein the computer useable program code for consolidating the at least one interaction into at least one interaction pattern comprises taking into account a component containment hierarchy and at least one relationship between the two or more components.

28. The computer program product of claim 27, wherein the component containment hierarchy and at least one relationship between the two or more components are expressed as at least one of a manifest file and a deployment descriptor.

29. The computer program product of claim 27, wherein the component containment hierarchy and the at least one relationship between the two or more components are stored in a global system configuration repository that addresses at least one of:
   one or more different packaged software products, one or more services, one or more software components, one or more service components and one or more computing systems.

30. The computer program product of claim 24, wherein the computer useable program code for observing at least one interaction between two or more components comprises observing at least one interaction between two or more components at run-time.

31. The computer program product of claim 24, further including computer useable program code for:
   including the at least one relationship specification in at least one of an installable package and/or media in the form of at least one deployment descriptor, a local repository as a relationship model, and a global repository as a relationship model.

32. The computer program product of claim 24, wherein the computer useable program code is operable within an integrated development environment (IDE).

33. The computer program product of claim 24, wherein the computer useable program code is operable within a hosting environment.

34. A computer-implemented method for storing at least one deployment descriptor for subsequent reuse and processing, the method comprising the steps of:
   determining at least one task relationship and at least one corresponding relationship constraint between at least two components of at least one computing system based on an interaction pattern determined between the at least two components interacting at run-time;
   consolidating the at least one task relationship with the at least one corresponding relationship constraint;
   using the at least one consolidated task relationship and relationship constraint to generate at least one deployment descriptor; and
   storing the at least one deployment descriptor, wherein the at least one deployment descriptor is useable for subsequent reuse and processing in managing the at least one distributed computing system and/or one or more different computing systems;
   wherein the interaction pattern between the at least two components comprises at least one causal relationship between interactions of the at least two components, wherein the at least one causal relationship between a first interaction and a second interaction comprises a relationship in which the first interaction causes an event on the at least one computing system in a same thread as the second interaction on the at least one computing system.

35. A computer program product comprising a computer readable storage medium having computer useable program code for storing at least one created relationship specification for subsequent reuse and processing, the computer program product including:

computer useable program code for determining at least one task relationship and at least one corresponding relationship constraint between at least two components of at least one computing system based on an interaction pattern determined between the at least two components interacting at run-time;

computer useable program code for consolidating the at least one task relationships with the at least one corresponding relationship constraint;

computer useable program code for using the at least one consolidated task relationship and relationship constraint to generate at least one deployment descriptor; and computer useable program code for storing the at least one deployment descriptor, wherein the at least one deployment descriptor is useable for subsequent reuse and processing in managing the at least one distributed computing system and/or one or more different computing systems;

wherein the interaction pattern between the at least two components comprises at least one causal relationship between the interactions of at least two components, wherein the at least one causal relationship between a first interaction and a second interaction comprises a relationship in which the first interaction causes an event on the at least one computing system in a same thread as the second interaction on the at least one computing system.

* * * * *